United States Patent
Yao et al.

(10) Patent No.: US 11,487,051 B2
(45) Date of Patent: Nov. 1, 2022

(54) POLARIZATION FILTERS HAVING NANOGRATING PATTERN AND PLASMONIC STRUCTURE ORIENTED AT NONZERO ANGLE

(71) Applicant: Arizona Board of Regents on behalf of Arizona State University, Scottsdale, AZ (US)

(72) Inventors: Yu Yao, Chandler, AZ (US); Jing Bai, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 108 days.

(21) Appl. No.: 17/157,438

(22) Filed: Jan. 25, 2021

(65) Prior Publication Data
US 2021/0348969 A1 Nov. 11, 2021

Related U.S. Application Data

(60) Provisional application No. 62/965,510, filed on Jan. 24, 2020.

(51) Int. Cl.
*G02B 5/00* (2006.01)
*G02B 5/30* (2006.01)
(Continued)

(52) U.S. Cl.
CPC ............ *G02B 5/008* (2013.01); *G01J 3/447* (2013.01); *G01J 4/04* (2013.01); *G01N 21/21* (2013.01);
(Continued)

(58) Field of Classification Search
CPC ............ G01J 3/0224; G01J 2003/1291; G01J 2003/4275; G01J 3/447; G01J 4/00–04;
(Continued)

(56) References Cited

U.S. PATENT DOCUMENTS 8,835,831 B2  9/2014  Yu et al.
8,835,905 B2  9/2014  Wober et al.
(Continued)

OTHER PUBLICATIONS

"Bossa Nova Vision, Salsa, Full Stokes polarization camera," 2022 [retreived on Jan. 27, 2022]. Retreived from the internet: <URL: https://www.bossanovavision.com/homepage/polarization-cameras/salsa/>.
(Continued)

*Primary Examiner* — Ryan S Dunning
(74) *Attorney, Agent, or Firm* — MH2 Technology Law Group LLP

(57) ABSTRACT

A circular polarization filter of a chiral metasurface structure is disclosed including a substrate having a nanograting pattern extending from the substrate, a dielectric layer formed directly on the nanograting pattern, and a plasmonic structure in direct contact with the dielectric layer, where the plasmonic structure may be oriented at a nonzero angle with respect to the nanograting pattern. An integrated polarization filter array is also disclosed including include a linear polarization filter, and a circular polarization filter. Methods of detecting full-stokes polarization using an integrated polarization filter array having both linear and circular polarization filters made from chiral metasurface structures is disclosed. Methods of using a Mueller matrix to evaluate polarization response of any optical device or system is also disclosed.

22 Claims, 20 Drawing Sheets

(51) Int. Cl.
  *G01J 3/447* (2006.01)
  *G01J 4/04* (2006.01)
  *G01N 21/21* (2006.01)
  *G02B 5/20* (2006.01)
  *G02B 1/00* (2006.01)
(52) U.S. Cl.
  CPC .............. *G02B 1/002* (2013.01); *G02B 5/201* (2013.01); *G02B 5/3041* (2013.01)
(58) Field of Classification Search
  CPC .......... G01N 21/21–23; G01N 2021/212–218; G01N 2021/258; G01N 21/553; G01N 21/554; G01N 2021/5903; G01N 21/648; G01N 21/658; G02B 5/008; G02B 5/30–3091; G02B 6/1226; G02B 27/28–288; G02F 1/133528–13355; G02F 1/13362; G02F 2203/10
  See application file for complete search history.

(56) References Cited

U.S. PATENT DOCUMENTS

| | | | |
|---|---|---|---|
| 2011/0285942 A1* | 11/2011 | Guo | G02F 1/133516 250/336.1 |
| 2011/0309237 A1 | 12/2011 | Seo et al. | |
| 2014/0346357 A1* | 11/2014 | Jarrahi | H01L 31/02327 250/338.4 |
| 2018/0309949 A1 | 10/2018 | Fossum et al. | |
| 2018/0364525 A1* | 12/2018 | Murata | G02F 1/134363 |

OTHER PUBLICATIONS

Gruev et al. "Dual-tier thin film polymer polarization imaging sensor," Optics Express, vol. 18, No. 18, Aug. 30, 2010, 12 pages.
Kunnen, B. et al., Application of circularly polarized light for non-invasive diagnosis of cancerous tissues and turbid tissue-like scattering media. Journal of Biophotonics 2015, 8 (4), 317-323.
Patel, R. et al., Polarization-Sensitive Multimodal Imaging for Detecting Breast Cancer. Cancer Research 2014, 74 (17), 4685-4693.
Salomatina-Motts, E. et al., Multimodal polarization system for imaging skin cancer. Optics and Spectroscopy 2009, 107 (6), 884-890.
Zhao, X. et al., Circle polarization shift keying with direct detection for free-space optical communication. Journal of Optical Communications and Networking 2009, 1 (4), 307-312.
Ichimoto, K. et al., Polarization Calibration of the Solar Optical Telescope onboard Hinode. In The Hinode Mission, Sakurai, T., Ed. Springer New York: New York, NY, 2008; pp. 179-207.
Tyo, J. S. et al., Review of passive imaging polarimetry for remote sensing applications. Appl. Opt. 2006, 45 (22), 5453-5469.
Li, Z. S. et al., Detection of methane with mid-infrared polarization spectroscopy. Applied Physics B 2004, 79 (2), 135-138.
Gurton, K.P. et al., Enhanced facial recognition for thermal imagery using polarimetric imaging. 2014; vol. 39, p. 3857-3859.
Short, N. et al., Improving cross-modal face recognition using polarimetric imaging. Opt Lett 2015, 40 (6), 882-885.
Bassan, P. et al., Large scale infrared imaging of tissue micro arrays (TMAs) using a tunable Quantum Cascade Laser (QCL) based microscope. Analyst 2014, 139 (16), 3856-3859.
Guo, B. et al., Laser-based mid-infrared reflectance imaging of biological tissues. Opt. Express 2004, 12 (1), 208-219.
Fukuda, H. et al., Silicon photonic circuit with polarization diversity. Opt. Express 2008, 16 (7), 4872-4880.
Roberts, K. et al., Performance of Dual-Polarization QPSK for Optical Transport Systems. Journal of Lightwave Technology 2009, 27 (16), 3546-3559.
Whitmore, L. et al., Protein secondary structure analyses from circular dichroism spectroscopy: Methods and reference databases. Biopolymers 2008, 89 (5), 392-400.
Tang, Y. et al., A. E., Enhanced Enantioselectivity in Excitation of Chiral Molecules by Superchiral Light. Science 2011, 332 (6027), 333-336.
Jin, L. et al., Noninterleaved Metasurface for (2$^6$-1) Spin- and Wavelength-Encoded Holograms. Nano Letters 2018, 18 (12), 8016-8024.
Zheng, G. et al., Metasurface holograms reaching 80% efficiency. Nature Nanotechnology 2015, 10, 308.
Gruev, V. et al., CCD polarization imaging sensor with aluminum nanowire optical filters. Opt. Express 2010, 18 (18), 19087-19094.
Li, W. et al., Circularly polarized light detection with hot electrons in chiral plasmonic metamaterials. Nat Commun 2015, 6, 8379.
Dong, J. et al., Bi-layer cross chiral structure with strong optical activity and negative refractive index. Opt. Express 2009, 17(16), 14172-14179.
Zhao, Y. et al., Twisted optical metamaterials for planarized ultrathin broadband circular polarizers. Nature Communications 2012, 3, 870.
Zhao, Y. et al., Chirality detection of enantiomers using twisted optical metamaterials. Nature Communications 2017, 8, 14180.
Afshinmanesh, F. et al., Measurement of the polarization state of light using an integrated plasmonic polarimeter. Nanophotonics 2012, 1 (2).
Lee, K. et al., Ultracompact Broadband Plasmonic Polarimeter. Laser & Photonics Reviews 2018, 12 (3), 1700297.
Chen, W. T. et al., Integrated plasmonic metasurfaces for spectropolarimetry. Nanotechnology 2016, 27 (22), 224002.
Pors, A. et al., Plasmonic metagratings for simultaneous determination of Stokes parameters. Optica 2015, 2 (8), 716-723.
Balthasar Mueller, J. P. et al., Ultracompact metasurface in-line polarimeter. Optica 2016, 3 (1), 42-47.
Arbabi, E. et al., Full-Stokes Imaging Polarimetry Using Dielectric Metasurfaces. ACS Photonics 2018, 5 (8), 3132-3140.
Yang, Z. et al., Generalized Hartmann-Shack array of dielectric metalens sub-arrays for polarimetric beam profiling. Nature Communications 2018, 9 (1), 4607.
Zhu, A. Y. et al., Giant intrinsic chiro-optical activity in planar dielectric nanostructures. Light: Science &Amp Applications 2018, 7, 17158.
Hu, J. et al., All-dielectric metasurface circular dichroism waveplate. Scientific Reports 2017, 7, 41893.
Gansel, J. K. et al., Gold Helix Photonic Metamaterial as Broadband Circular Polarizer. Science 2009, 325 (5947), 1513-1515.
Frank, B. et al., Large-Area 3D Chiral Plasmonic Structures. ACS Nano 2013, 7 (7), 6321-6329.
Yu, N. et al., A Broadband, Background-Free Quarter-Wave Plate Based on Plasmonic Metasurfaces. Nano Letters 2012, 12(12), 6328-6333.
Wu, P. C. et al., Versatile Polarization Generation with an Aluminum Plasmonic Metasurface. Nano Letters 2017, 17 (1), 445-452.
Rubin, N. A. et al., Polarization state generation and measurement with a single metasurface. Opt. Express 2018, 26 (17), 21455-21478.
Liang, G. et al., Monolithic Semiconductor Lasers with Dynamically Tunable Linear-to-Circular Polarization. ACS Photonics 2017, 4 (3), 517-524.
Zhao, Y. et al., Manipulating light polarization with ultrathin plasmonic metasurfaces. Phys. Rev. B 2011, 84 (20), 6.
Yu, N. et al., Flat optics with designer metasurfaces. Nature Materials 2014, 13, 139.
Kats, M. A. et al., Thin-Film Interference in Lossy, Ultra-Thin Layers. Opt. Photon. News 2014, 25 (1), 40-47.
Pfeiffer, C. et al., Bianisotropic Metasurfaces for Optimal Polarization Control: Analysis and Synthesis. Phys Rev Appl 2014, 2 (4).
Schaefer, B. et al., Measuring the Stokes polarization parameters. American Journal of Physics 2007, 75 (2), 163-168.
Kikuta et al., "Achromatic quarter-wave plates using the dispersion of form birefringence," Applied Optics, vol. 36, Issue 7, Mar. 1, 1997, pp. 1566-1572.

(56) References Cited

OTHER PUBLICATIONS

Lueder, E., "Electro-optic Effects in Twisted Nematic Liquid Crystals," Liquid Crystal Displays: Addressing Schemes and Electro-Optical Effects, John Wiley Sons, Incorporated, 2010.
Nordin et al., "Broadband form birefringent quarter-wave plate for the mid-infared wavelength region," Optics Express, vol. 5, No. 88, Oct. 11, 1999, pp. 163-169.
PCT Written Opinion of the International Searching Authority and International Search Report dated Jun. 20, 2019 in corresponding PCT Application No. PCT/US2018/067109, 11 pages.
Sato et al., "Compact ellipsometer employing a static polarimeter module with arrayed polarizer and wave-plate elements," Applied Optics, vol. 46, No. 22, Jul. 6, 2007.
Nafie, L.A. et al., "Vibrational circular dichroism," Journal of the American Chemical Society, vol. 98, pp. 2715-2723, doi:10.1021/ja00426a007 (1976).
Rubin, N. A. et al., "Matrix Fourier optics enables a compact full-Stokes polarization camera," Research Article, Science, 2019, vol. 365, No. 43, Issue 6448, 10 pages.
Yeh, P., "Electromagnetic Propagation in Birefringent Layered Media," J Opt Soc Am, 1979, vol. 69, No. 5, pp. 742-756.
Bao, Q. Loh, K. P., "Graphene Photonics, Plasmonics, and Broadband Optoelectronic Devices," ACS Nano 6, 3677-3694, (2012).
Kuramochi, H. er al., "Probing the early stages of photoreception in photoactive yellow protein with ultrafast time-domain Raman spectroscopy," Nature Chemistry 9, 660-666, (2017).
He, F. et al., "Femtosecond laser fabrication of monolithically integrated microfluidic sensors in galss," Sensors 14, 19402-19440 (2014).
Brunner, D. er al., "Parallel photonic information processing at gigabyte per second data rates using transient states," Nature Communications 4, 1364, (2013).
Sun et al., "Optiocal modulators with 2D layered materials," Nature Photonics 10, 227-238, (2016).
Chen J.-H. et al., "An all-optical modulator based on a stereo graphene-microfiber structure," Light: Science Applications 4, (2015).
Guo, Q. et al., "Universal Near-Infrared and Mid-Infrared Optical Modulation for Ultrafast Pulse Generation Enabled by Colloidal Plasmonic Semiconductor Nanocrystals," ACS Nano 10, 9463-9469, (2016).
Ding, L. et al., "All-Optical Modulation in Chains of Silicon Nanoantennas," ACS Photonics 7, 1001-1008, (2020).
Afinogenov et al., "Ultrafast All-Optical Light Control with Tamm Plasmons in Photonic Nanostructures," ACS Photonics 6, 844-850, (2019).
Shen, L. et al., "Two-photon absorption and all-optical modulation in germanium-on-silicon waveguides for the mid-infrared," Opt. Lett. 40, 2213-2216, (2015).
Wu, R. et al., "All-Optical Modulation and Ultrafast Switching in MWIR with Sub-Wavelength Structured Silicon," Applied Sciences 9, 1808 (2019).
Yu, J.-P. et al., "Accelerating terahertz all-optical modulation by hot carriers effects of silver nanorods in PVA film," AIP Advances 9, 075017, (2019).
Reed, G. T. et al., "Silicon optical modulatorsm" Nature Photonics 4, 518-526, (2010).
Schönenberger, S. et al., "Ultrafast all-optical modulator with femtojoule absorbed switching energy in silicon-on-insulator," Opt. Express 18, 22485-22496, (2010).
Manolatou, C. et al., "All-optical silicon modulators based on carrier injection by two-photon absorption," Journal of Lightwave Technology 24, 1433-1439, (2006).
Almeida, V. R. et al., "All-optical control of light on a silicon chip," Nature 431, 1081-1084, (2004).
Liu, A. et al., "High-speed optical modulation based on carrier depletion in a silicon waveguide," Opt. Express 15, 660-668 (2007).
Xu, Q. et al., "12.5 Gbit/s carrier-injection-based silicon micro-ring silicon modulators," Opt. Express 15, 430-436, (2007).

Feng, D. et al., "High speed GeSi electro-absorption modulator at 1550 nm wavelength on SOI wavelength," Opt. Express 20, 22224-22232 (2012).
Watts, M. R. et al., Ultralow power silicon microdisk modulators and switches, 2008 5th IEEE international conference on group IV photonics. 4-6 (IEEE).
Baba, T. et al. "Slow-light Mach-Zehnder modulators based on Si photonic crystals," Science and technology of advanced materials 15, 024602 (2014).
Li, W. et al., "Ultrafast All-Optical Graphene Modulator," Nano Letters 14, 955-959, (2014).
Sun, F. et al., "The all-optical modulator in dielectric-loaded wavelength with graphene-silicone heterojunction structure," Nanotechnology 29, 135201, (2018).
Dash, A. et al., "Enhanced all-optical cavity-tuning using graphene," Opt. Express 27, 34093-34102, (2019).
Sun, F. et al., "All-optical modulator based on a graphene-plasmonic slot waveguide at 1550 nm," Applied Physics Express 12, 042009, (2019).
Wen, Q-Y. et al., "Graphene based All-Optical Spatial Terahertz Modulator," Scientific Reports 4, 7409, (2014).
Tasolamprou, A. C. et al., "Experimental Demonstration of Ultrafast THz Modulation in a Graphene-Based Thin Film Absorber through Negative Photoinduced Conductivity," ACS Photonics 6, 720-727, (2019).
Yao, Y. et al., "Wide Wavelength Tuning of Optical Antennas on Graphene with Nanosecond Response Time," Nano Letters 14, 214-219, (2014).
Yao, Y. et al., "Electrically Tunable Metasurface Perfect Absorbers for Ultrathin Mid-Infrared Optical Modulators," Nano Letters 14, 6526-6532, (2014).
Ulstrup, S. et al., "Ultrafast electron dynamics in epitaxial graphene investigated with time-and angle-resolved photoemission spectroscopy," Journal of Physics: Condensed Matter 27, 164206 (2015).
Gierz, I. et al., "Snapshots of non-equilibrium Dirac carrier distributions in graphene," Nature materials 12, 1119-1124 (2013).
Lui, C. H. et al., "Ultrafast Photoluminescence from Graphene," Physical Review Letters 105, 127404, (2010).
Flueraru et al. "Error Analysis of a Rotating Quarter-Wave Plate Stokes' Polarimeter," IEEE Transactions on Instrumentation and Measurement, vol. 57, No. 4, Apr. 2008, 5 pages.
Basiri et al. "Nature-inspired chiral metasurfaces for circular polarization detection and full-Stokes polarimetric measurements," Light: Science & Applications Accepted, 2019, 11 pages.
Christian et al. "Probabilistic Analysis to Quantify Optical Performance and Error Budgets for Next Generation Heliostats," Journal of Solar Energy Engineering, vol. 137, Jun. 2015, 8 pages.
Collado F.J. "Preliminary design of surrounding heliostat fields", Renewable Energy, vol. 34, No. 5., May 1, 2009, p. 1359-1363.
Noone et al. "Heliostat field optimization: A new computationally efficient model and biomimetic layout," Solar Energy, vol. 86, 2012, 86, pp. 792-803.
Eddhibi et al. "Optical study of solar tower power plants," J. Phys.: Conf. Ser. 596, 2015, 8 pages.
Kistler, B. L. "A User's Manual for DELSOL3: A Computer Code for Calculating the Optical Performance and Optimal System Design for Solar Thermal Central Receiver Plants," Sandia National Laboratories, Sandia Report No. SAND 86-8018, 1986, 239 pages.
Gurton et al. "Measured Degree of Infrared Polarization for a Variety of Thermal Emitting Surfaces," Army Research Laboratory, Adelphi, MD, Jun. 2004, 34 pages.
Hu et al. Polarization: Measurement, Analysis, and Remote Sensing XIII, Jun. 21, 2018, full document.
Perkins et al. "Signal-to-noise anaylsis of Stokes parameters in division of focal plane polarimeters," Optics Express, vol. 18, No. 25, Dec. 6, 2010, 10 pages.
Behadur, Birendra. "Liquid Crystal Displays," Molecular Crystals and Liquid Crystals, 1984, 109 (1), pp. 3-93.
Stephens, Philip J. "Vibrational Circular Dichroism Spectroscopy: A New Tool for the Stereochemical Characterization of Chiral Molecules," ChemInform, 2004, 35 (27), pp. 699-725.
Yang et al. "Vibrational Circular Dichroism Spectroscopy of Chiral Molecules," Top Curr Chem, 2011, 298, pp. 189-236.

(56) References Cited

OTHER PUBLICATIONS

Hou-Tong, C. et al., Reports on Progress in Physics 2016, 79, (7), 076401.

Khorasaninejad, M. et al., Metalenses at visible wavelengths: Diffraction-limited focusing and subwavelength resolution imaging, Science 2016, 352, (6290), 1190-1194.

Afshinmanesh, F. et al., Measurement of the polarization state of light using an integrated plasmonic polarimeter, Nanophotonics 2012, 1, (2), 125-129.

Martinez, N. J. et al., Single photon detection in a waveguide-coupled Ge-on-Si lateral avalanche photodiode Opt Express 2017, 25, (14), 16130-16139.

Garcia, N. M. et al., Surface normal reconstruction using circularly polarized light, Opt Express 2015, 23, (11), 14391-14406.

Tamura, M. et al., First Two-Micron Imaging Polarimetry of β Pictoris, The Astrophysical Journal, 2006, 641: 1172-1177.

\* cited by examiner

POLARIZATION FILTERS HAVING NANOGRATING PATTERN AND PLASMONIC STRUCTURE ORIENTED AT NONZERO ANGLE

RELATED APPLICATIONS

This application claims priority to U.S. Provisional Patent Application No. 62/965,510 filed Jan. 24, 2020 and entitled, "CHIRAL PLASMONIC METASURFACES FOR POLARIZATION DETECTION AND MANIPULATION." The 62/965,510 application is hereby incorporated by reference in its entirety.

STATEMENT OF GOVERNMENT INTEREST

This invention was made with government support under FA9550-16-1-0183 awarded by the Air Force Office of Scientific Research. The government has certain rights in the invention.

TECHNICAL FIELD

This disclosure relates to chiral plasmonic metasurfaces for generation, manipulation, and detection of the polarization state of light.

BACKGROUND

Chiral materials and molecules are useful for various applications, including optical communication, circular dichroism (CD) spectroscopy, chemical analysis, biomedical diagnosis as well as polarization detection and imaging. Yet, chiral materials in nature usually have weak chiral-optical effect and require long optical paths to achieve sufficiently large chirality for practical applications, resulting in fundamental limitations on device miniaturization. Recent demonstrations of chiral metamaterials have achieved much stronger chiral effects than their natural counterparts with ultra-compact footprints, which may lead to miniaturization of polarization manipulation and detection devices and may also enable a number of new applications such as hologram multiplexing and refractive index sensing. Various types of chiral metamaterial/metasurface structures have been explored with different efficiency and performance (CD and circular polarization extinction ratio (CPER)). 3D helical structures may exhibit high efficiency up to 92% and CD up to 0.87. However, the fabrication of 3D structures is very challenging and not scalable. While chiral metamaterials based on single or stacked planar plasmonic metasurfaces may have the potential to significantly reduce fabrication complexity, it is challenging to mitigate the high optical loss of such plasmonic structures. The state-of-art solutions for low-loss chiral metamaterials are based on dielectric and dielectric-metal hybrid structures. Some of the more efficient planar chiral metamaterial designs are based on dielectric gammadion which has a transmission efficiency of up to 87%, yet with low CPER (<10). Therefore, it remains challenging to achieve high-performance chiral metamaterials with both high efficiency and large CPER.

In addition, optical losses in plasmonic structures severely limit practical applications, particularly in visible (VIS) and near-infrared (NIR) wavelength ranges. Here we present the design concept and experimental demonstration for highly efficient subwavelength-thick plasmonic chiral metamaterials with strong chirality. Therefore, there is a need for designs that utilize plasmonic metasurfaces to control the phase and polarization of light and exploit anisotropic thin-film interference effects to enhance optical chirality while minimizing optical loss. There is further a need for circular polarization filters with transmission efficiency >90% and extinction ratio >180, polarization converters with conversion efficiency >90% as well as on-chip integrated micro-filter arrays for full-Stokes polarization detection over a broad wavelength range (3.5~5 μm), and potentially applicable from near-infrared (NIR) to Terahertz regions via structural engineering.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A circular polarization filter is disclosed which includes a substrate. The circular polarization filter also includes a nanograting pattern extending from the substrate, a dielectric layer formed directly on the nanograting pattern, and a plasmonic structure in direct contact with the dielectric layer, where the plasmonic structure may be oriented at a nonzero angle with respect to the nanograting pattern. In certain embodiments, the circular polarization filter may include a nanograting pattern having parallel protrusions extending from the substrate. The plasmonic structure may include plasmonic bar antennas, which may further include parallel protrusions extending from or buried in the dielectric layer. The dielectric layer may include $SiO_x$, aluminum oxide, or an undoped semiconductor. The substrate of the circular polarization filter may transmit light in an operation wavelength of the circular polarization filter. The nanograting pattern of the circular polarization filter may have a duty cycle between about 20% and about 80% or between about 40% and about 60%, and the dielectric layer may have a thickness between about 100 nm and about 10,000 nm, between about 100 nm and about 1000 nm, or between about 300 nm and about 400 nm.

An integrated polarization filter array is also disclosed. The integrated polarization filter array may include a linear polarization filter, and a circular polarization filter which further includes a substrate, a nanograting pattern extending from the substrate, a dielectric layer formed directly on the nanograting pattern, and a plasmonic structure in direct contact with the dielectric layer, where the plasmonic structure is oriented at a nonzero angle with respect to the nanograting pattern. In certain embodiments, the integrated polarization filter array may have a nanograting pattern which may include parallel protrusions extending from the substrate, and the plasmonic structure may include parallel protrusions extending from or buried in the dielectric layer.

A method of detecting full-stokes polarization is also disclosed. The method of detecting full-stokes polarization may include introducing polarized light into an integrated polarization filter array having at least two polarization filters, measuring intensity of linear and circular polarization components of the polarized light, collecting incident light transmitted from the integrated polarization filter array with a detector, and calculating stokes parameters of the incident light. The method may include moving the integrated polarization filter array in an x-axis and/or a y-axis relative to the polarized light. The method may also include measuring insertion loss for a polarization state transmitted by one of the polarization filters or generating additional polarization states of the polarized light by changing a rotation angle of a linear polarizer and a quarter wave plate coupled to the integrated polarization filter array. The integrated polarization filter array may include six polarization filters, including in an embodiment, four linear polarization filters and two circular polarization filters.

DETAILED DESCRIPTION

Figure 1:
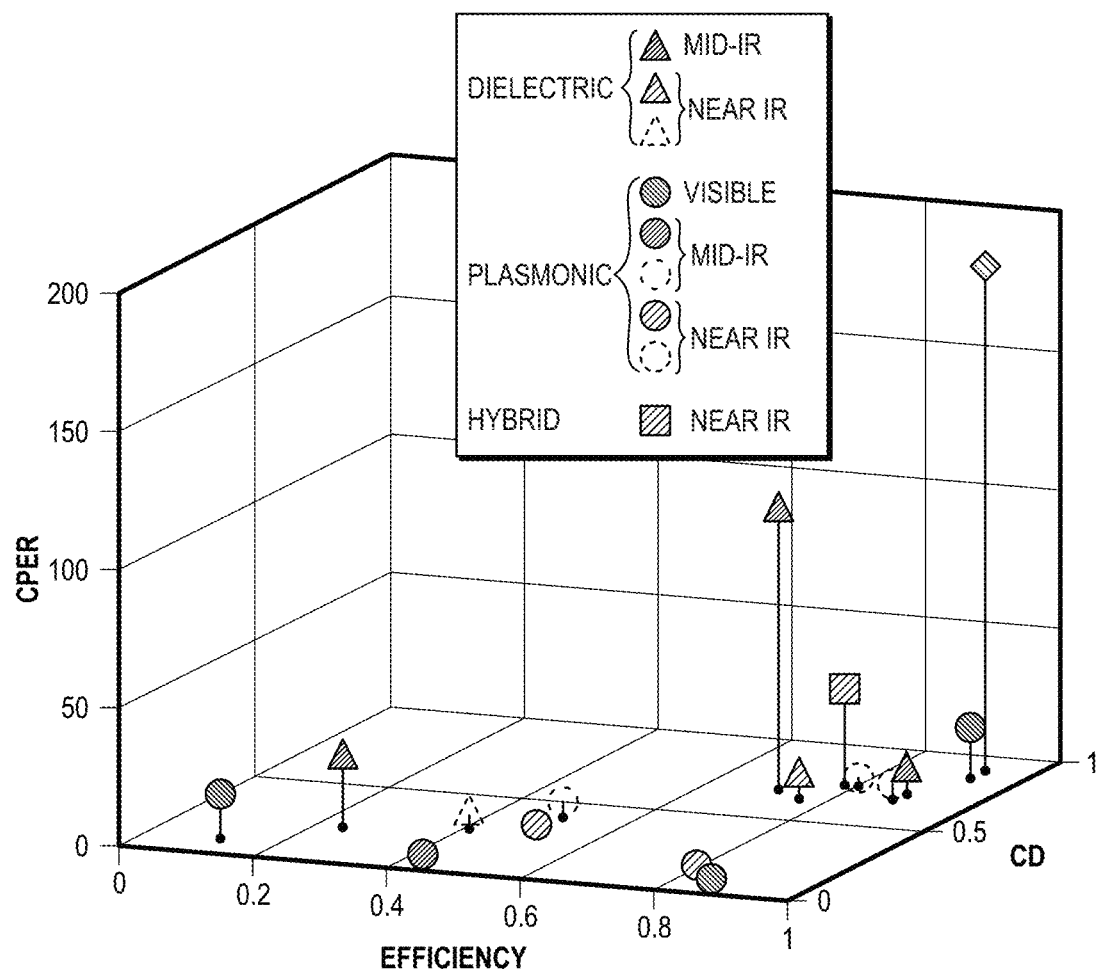
FIG. 1 is a three-dimensional plot illustrating a comparison of efficiency, circular dichroism (CD) and circular polarization extinction ratio (CPER) between chiral metamaterial designs based on 3D helical structures, plasmonic, dielectric and hybrid metamaterial/metasurfaces.

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, AB/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

Plasmonic chiral metasurface structures as circular polarization (CP) filters for wavelength ranges from visible through mid-infrared ranges and beyond are disclosed. In one implementation, CP filters with a transmission efficiency >85% and an extinction ratio (r=TLCP/TRCP) over 100 at 4 μm are described. These structures include rationally designed plasmonic antennas and nanowires that are vertically integrated with a subwavelength-thick dielectric spacer layer. The total thickness of the device can be less than 1/10 of the operation wavelength. The CP filters can be integrated with nanowire grating linear polarization filters on the same chip for full stokes polarization detection. The operation wavelength of the devices can be engineered from visible to far-infrared (FIR) regions (400 nm to 30 μm) and beyond by changing the design parameters. The designs can be directly integrated onto various semiconductor-based photodetectors and imaging arrays, and thus enable on-chip polarization detection and imaging for various applications such as circular dichroism (CD) spectroscopy, polarimetric imaging and sensing, and molecular spectroscopy.

Plasmonic chiral metamaterial structures described herein may include two anisotropic metasurfaces and a dielectric spacer layer between them, as shown in FIG. 1. FIG. 1 is a three-dimensional plot illustrating a comparison of efficiency, circular dichroism (CD) and circular polarization extinction ratio (CPER) between chiral metamaterial designs based on 3D helical structures, plasmonic, dielectric and hybrid metamaterial/metasurfaces. The working wavelength of each design type is indicated in the accompanying legend. The material of each design is indicated with shape (triangle: dielectric; circle: plasmonic; square: hybrid). Solid/hollow shapes represent structures operated in transmission/reflection mode. The performance of the exemplary embodiments of chiral plasmonic metamaterial (CPM) designs as described herein are represented with a star.

Exemplary implementations of chiral plasmonic metamaterials (CPMs) with strong chirality (CD>0.9), high transmission efficiency (>90%) and subwavelength thickness (<λ/7) in mid-infrared (mid-IR) spectral range are described herein. The aforementioned rationale for such highly efficient plasmonic metamaterials with ultra-strong optical chiral effects has been established, and experimental demonstration of polarization converters with conversion efficiency up to 90% and CP filters with CPER up to 180 is further disclosed herein. By integrating the CPMs into an on-chip microscale polarization filter array, full-Stokes polarization detection with high accuracy over a broad wavelength range from 3.5 to 5 μm may be realized.

Figure 2A:
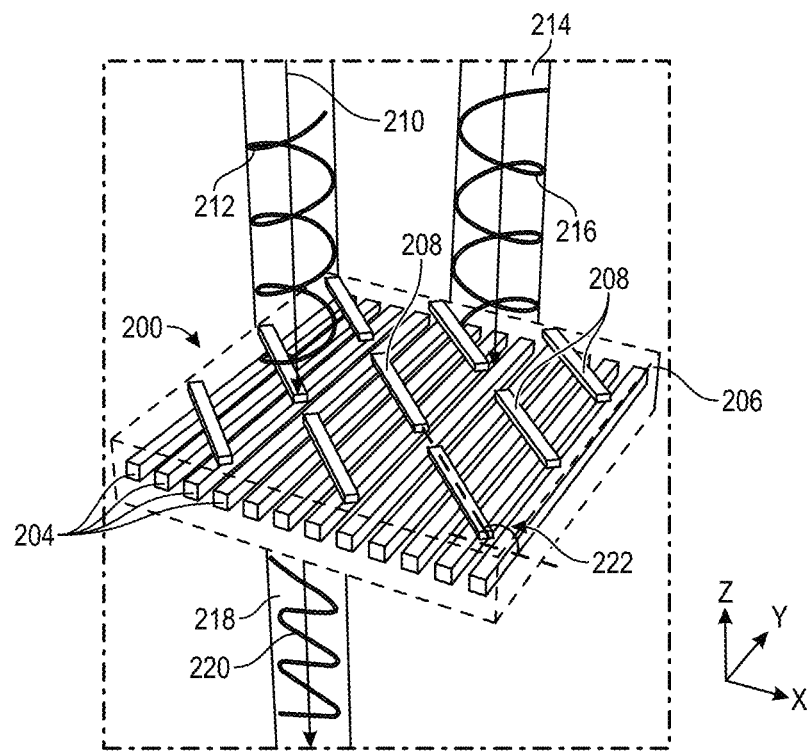
FIGS. 2A-2I represent several design concepts and simulation results of highly efficient chiral plasmonic materials, according to one or more embodiments disclosed.
Figure 2B:
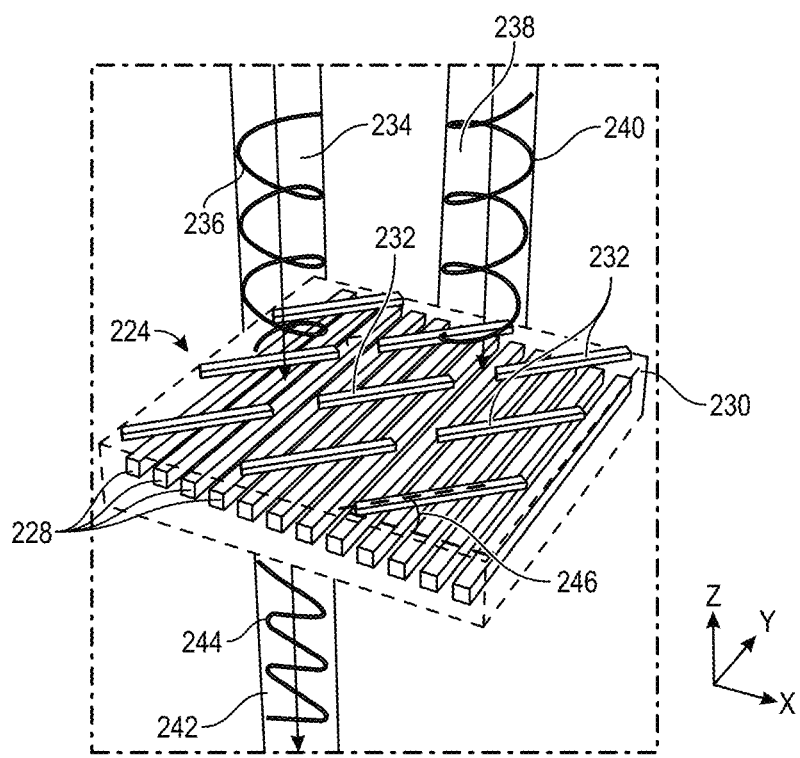

FIGS. 2A-2I represent several design concepts and simulation results of highly efficient chiral plasmonic materials, according to one or more embodiments disclosed. FIGS. 2A and 2B shows a schematic of two CPM designs with opposite handedness. In both designs, the bottom metasurface consists of parallel gold nanogratings along the y-axis; while the plasmonic antennas of the top metasurfaces are oriented at 135° (right-handed CPM, FIG. 2A) and 45° (left-handed CPM, FIG. 2B) with respect to the x-axis, resulting in chiral plasmonic structures with no inversion center or reflection symmetry. These two structures in FIGS. 2A and 2B are mirror images of each other; therefore, they exhibit selective transmission for circularly polarized (CP) light with opposite handedness, i.e., right-handed CP (RCP) and left-handed CP (LCP) light, respectively.

FIG. 2A illustrates a schematic of a right chiral plasmonic metamaterial (RCPM) device 200. The RCPM 200 includes a substrate 202 with several gold nanogratings 204 disposed in parallel pattern upon the surface of the substrate 202. The nanogratings 204 are covered and leveled by a dielectric layer 206. Disposed upon the dielectric layer 206 are several plasmonic antennas 208 which are oriented at a nonzero angle with respect to the nanograting pattern, in this embodiment at an angle 222 of 135°. This structure provides two anisotropic non-chiral plasmonic metasurfaces with a dielectric spacing layer between them. Also illustrated in FIG. 2A is incoming right-handed circularly polarized (CP) light 210 having an indication of right-handed chirality 212. Also shown is incoming left-handed circularly polarized (CP) light 214 having an indication of left-handed chirality 216. Selectively transmitted right-handed circularly polarized (CP) light 218 having an indication of right-handed chirality 220 is exhibited with the right chiral plasmonic metamaterial (RCPM) device 200.

FIG. 2B illustrates a schematic of a left chiral plasmonic metamaterial (LCPM) device 224. The LCPM includes a substrate 226 with several gold nanogratings 228 disposed in a parallel pattern upon the surface of the substrate 226. The nanogratings 228 are covered and leveled by a dielectric layer 230. Disposed upon the dielectric layer 230 are several plasmonic antennas 232 which are oriented at a nonzero angle with respect to the nanograting pattern, in this embodiment at an angle 246 of 45°. This structure provides two anisotropic non-chiral plasmonic metasurfaces with a dielectric spacing layer between them. Also illustrated in FIG. 2B is incoming left-handed circularly polarized (CP) light 234 having an indication of left-handed chirality 236. Also shown is incoming right-handed circularly polarized (CP) light 238 having an indication of right-handed chirality 240. Selectively transmitted left-handed circularly polarized (CP) light 242 having an indication of left-handed chirality 244 is exhibited with the right chiral plasmonic metamaterial (RCPM) device 224.

Figure 2C:
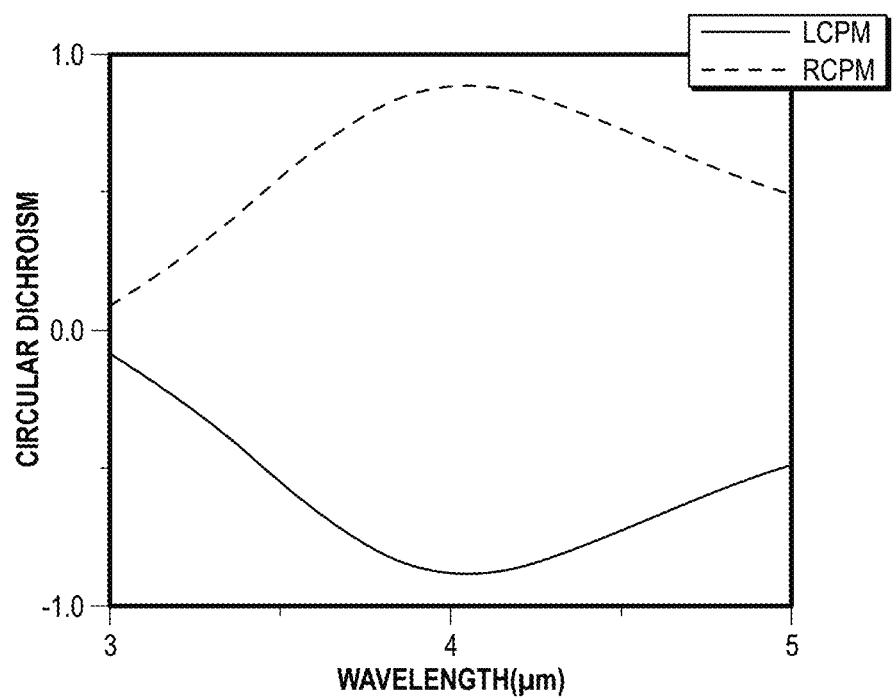
Figure 2D:
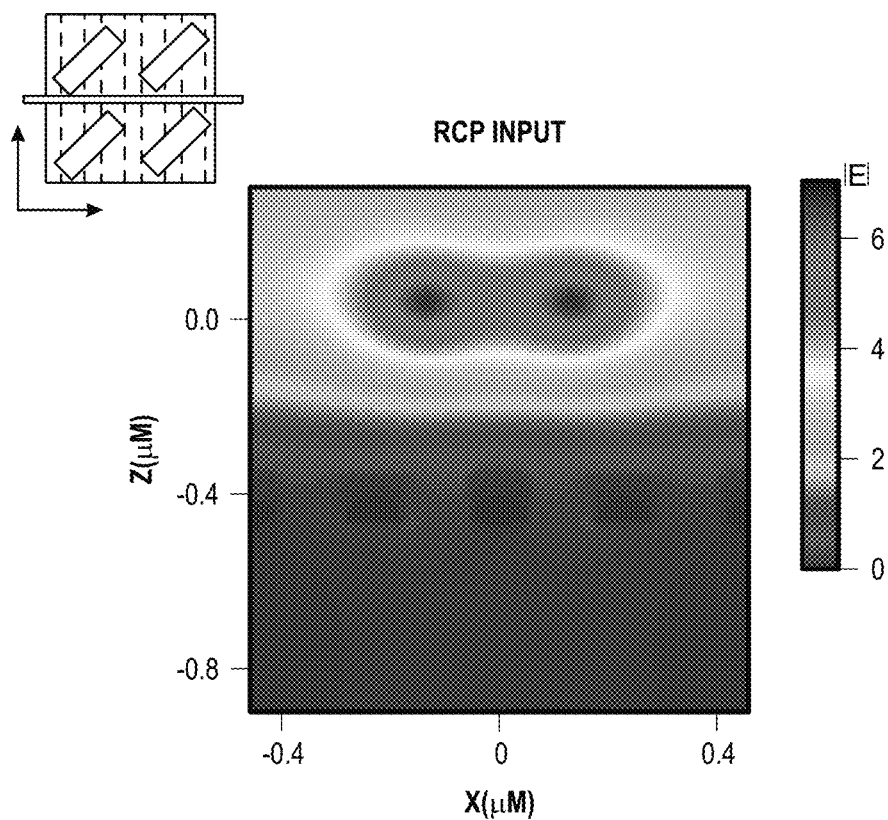
Figure 2E:
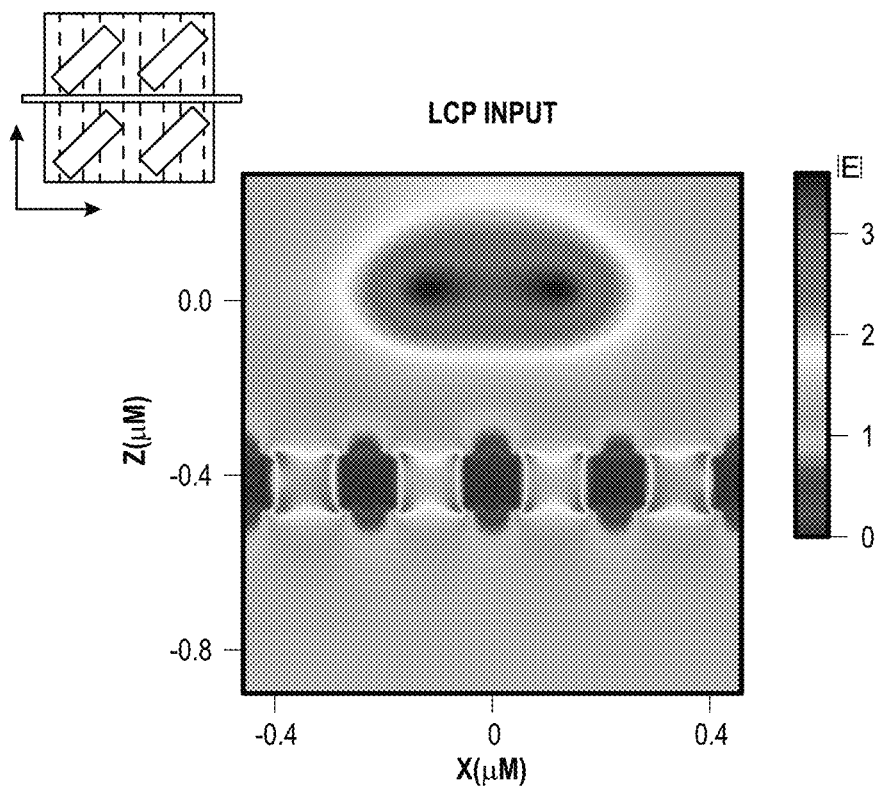

The circular dichroism (CD) of the right-handed CPM (RCPM, FIG. 2A) and left-handed CPM (LCPM, FIG. 2B) obtained via full-wave simulation is shown in FIG. 2C. Both structures show strong chiral response (|CD|>0.9) at wavelengths around 4 µm, indicating that both structures are optimized for wavelength around 4 µm. The design dimensions for the devices shown in FIGS. 2A and 2B are nanoantenna length of 1000 nm, thickness of 55 nm, and a period of 920 nm. The nanograting dimensions are a width of 115 nm a period of 230 nm and a spacer thickness of 350 nm. Simulation results of the near field distribution for the LCPM design suggest that RCP input light is reflected from the nanograting layer with very low transmission $T_{RCP}$<0.3%, as shown in FIG. 2D, while LCP input light is transmitted through the double-layer structure with transmission $T_{LCP}$≈90%, as shown in FIG. 2E. Unlike conventional plasmonic structures, which usually suffer from high optical loss, the presented CPM structure embodiment exhibit strong optical chiral effects with record-high efficiency among all reported chiral metamaterials and metasurfaces, including dielectric structures. Adopting an anisotropic thin-film interference model may provide an intuitive explanation.

Figure 2F:
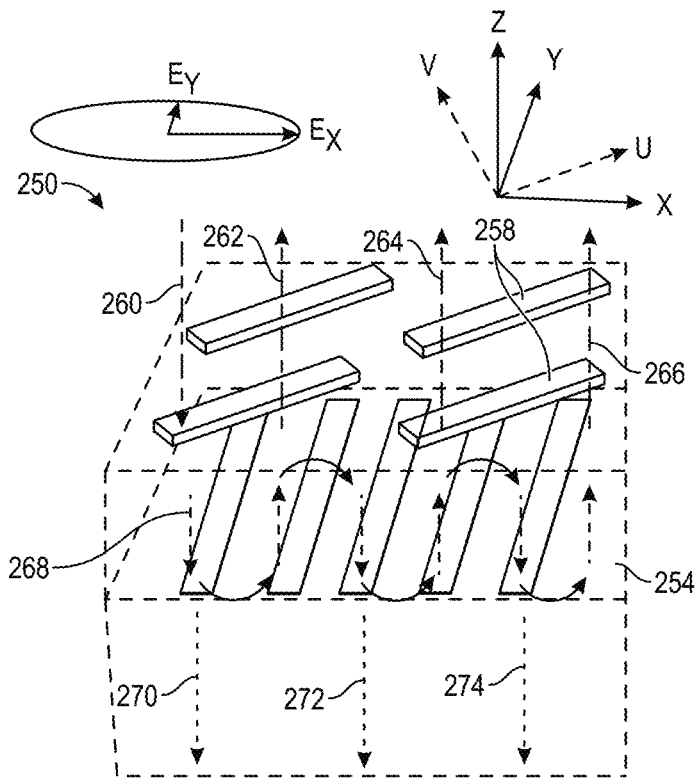
Figure 2G:
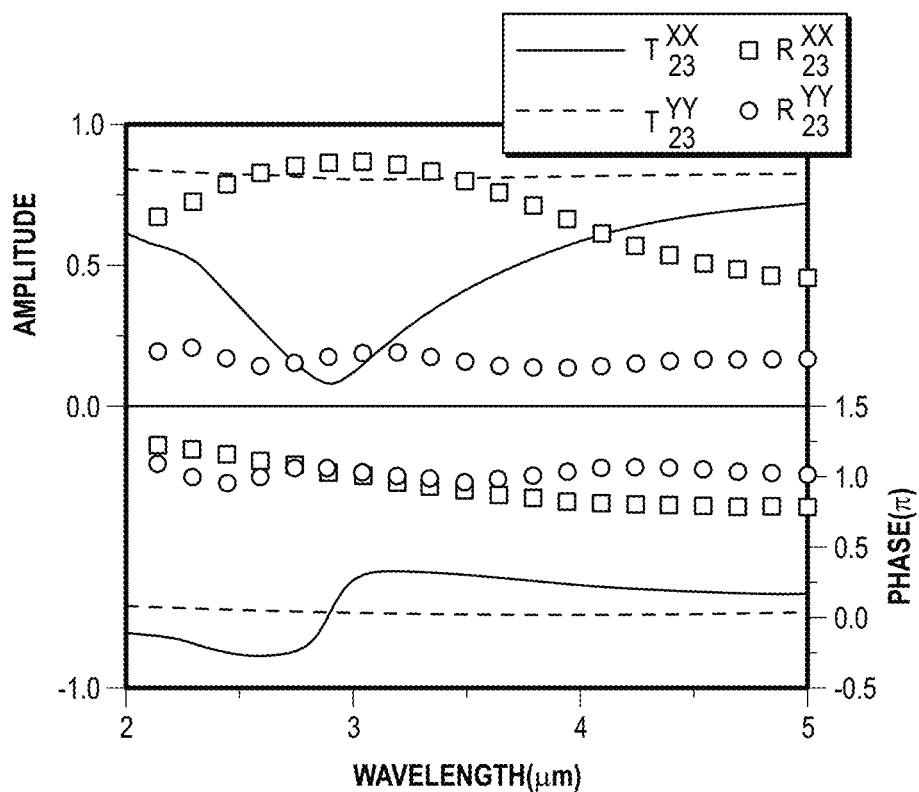
Figure 2G:
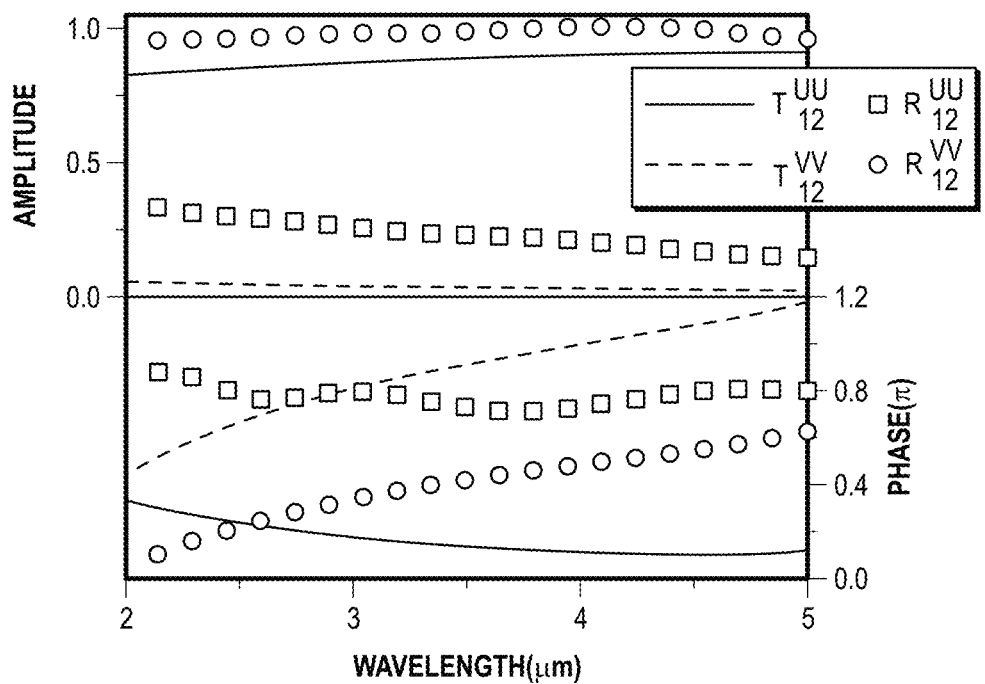

FIG. 2F shows a schematic of an LCPM structure 250 with a bottom gold nanograting layer 254 having parallel nanogratings 256 oriented along the y-axis and the plasmonic antennas 258 of the top metasurface oriented along the u-axis (45° with respect to x-axis). For simplicity, only consider normal incident light 260 is considered here. Assume the electric field vectors for incident, transmitted and reflected light are $$E_{inc} = \begin{pmatrix} E_{inc}^x \\ E_{inc}^y \end{pmatrix}, E_t = \begin{pmatrix} E_t^x \\ E_t^y \end{pmatrix} \text{ and } E_r = \begin{pmatrix} E_r^x \\ E_r^y \end{pmatrix},$$

respectively. Multi-order transmission and reflection occur between the top and bottom metasurfaces, as indicated by a set of arrows 268. Transmitted light 270, 272, 274 is also indicated. FIG. 2G is a plot showing amplitude and phase of transmission (solid lines) and reflection (solid circles) matrix elements of nanoantenna metasurface (top panel) and nanograting metasurface (bottom panel) of the LCPM design of FIG. 2B. Each order of transmitted and reflected electric field vectors are considered as partial waves. The partial waves accumulate phase during the propagation inside the spacer layer and experience abrupt phase changes upon reflection and transmission at the top and bottom metasurfaces. The anisotropic nature of both metasurfaces results in polarization-dependent phase and amplitude transmission/reflection, which is modeled by 2-by-2 matrices. The transmission and reflection coefficient for the $l^{th}$ (l=1, 2, 3, . . . ) order partial waves can be described with 2×2 matrices $t^{(l)}$ and $r^{(l)}$, respectively. The total transmitted electrical field can be expressed as the sum of all transmitted partial waves $$E_t = \left( \sum_{l=1}^{\infty} t^{(l)} \right) \cdot E_{inc}$$

and the total reflected electric field as the sum of all reflected partial waves $$E_r = \left( \sum_{l=1}^{\infty} r^{(l)} \right) \cdot E_{inc}.$$

A detailed description of the theoretical model is presented later. The reflection and transmission matrix elements of the top plasmonic antenna metasurface (FIG. 2G) indicate its first order resonance wavelength is around 3 µm while the operation wavelength of this CPM design is close to 4 µm, which is intended to reduce the plasmonic loss of the antenna metasurfaces.

Figure 2H:
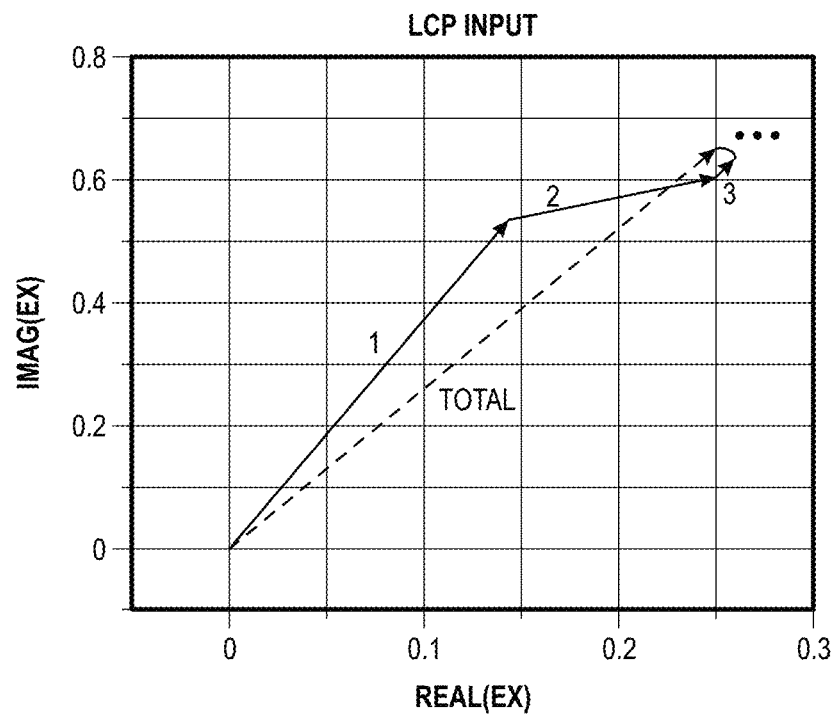
Figure 2H:
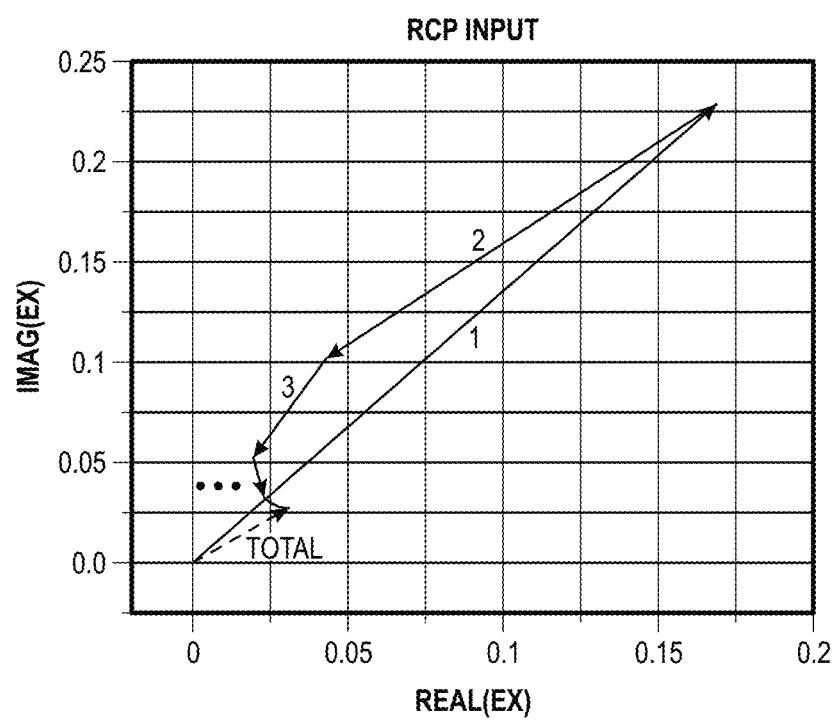
Figure 2I:
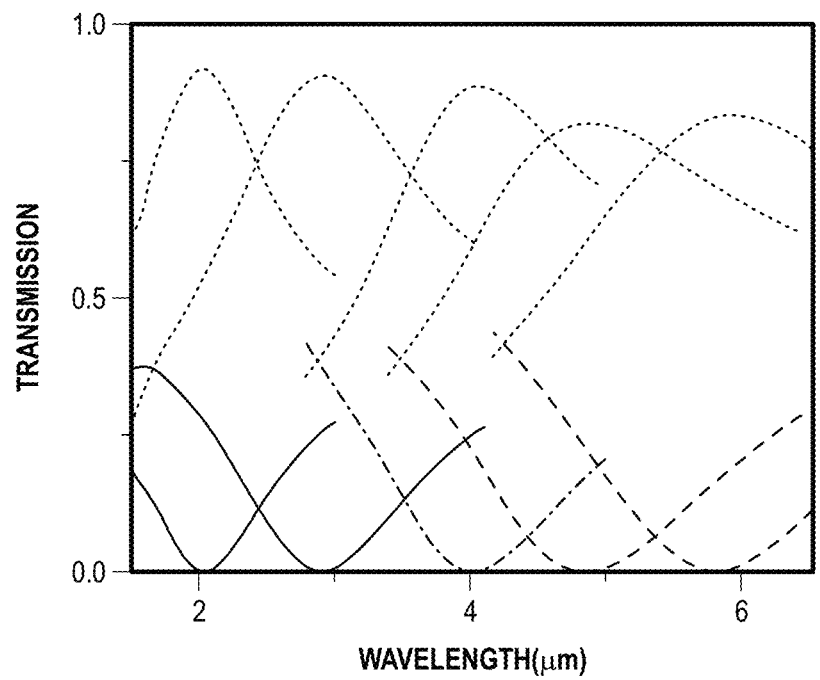
Figure 2I:
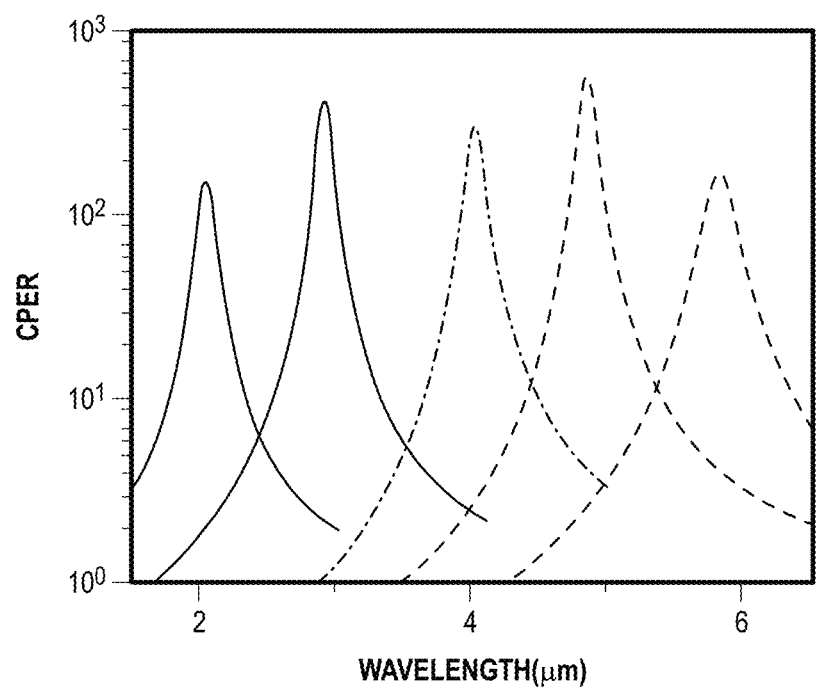

By rationally engineering the top and bottom plasmonic metasurfaces, the constructive/destructive interferences of the partial waves may be exploited for incident LCP/RCP light to achieve strong chirality (~0.9), as illustrated by the phasor diagrams in FIG. 2H, which is a set of vector plots for the complex Ex field components of transmitted light through LCPM with LCP (FIG. 2B)/RCP (FIG. 2A) incident light, illustrating anisotropic thin-film constructive/destructive interference effects. The order of the transmitted partial waves is indicated on the black arrows. The total transmitted Ex field is presented with a red arrow. By components are blocked by the nanogratings hence negligible. The amplitude and phase of the partial waves are represented by the length and direction of the vectors in complex planes. By adding up all the partial wave vectors, one can obtain the total transmitted field. It should be noted that the total field is dominated by $1^{st}$ to $3^{rd}$ partial waves and higher-order partial waves decay exponentially. For LCP input light, the transmitted $1^{st}$ to $3^{rd}$ partial waves exhibit similar vector directions and thus add up constructively, which leads to high transmission; while for RCP light, the transmitted $2^{nd}$ and $3^{rd}$ order partial waves exhibit almost opposite directions to the $1^{st}$ order partial waves and thus add up destructively which leads to diminished transmission. Based on the analysis of the phasor diagrams, it may be concluded that the key to strong chirality and high efficiency of the CPM designs lies in engineering structures to achieve constructive/destructive interferences for CP light with different handedness as well as low optical loss of both metasurfaces (<5% for nanoantenna metasurface and <3.8% for nanograting metasurface) around the operational wavelengths (~4 µm). The proposed structures offer great design flexibility, including geometries of the top and bottom metasurfaces, rotation angle between metasurfaces, spacer layer material and thickness, etc. Moreover, if necessary, one can also design structures with more than two layers of metasurfaces. Such design flexibility is appealing for realizing desired properties and operational wavelengths; however, it is time-consuming to perform structure optimization. In this case, an anisotropic transfer matrix approach may be employed to assist the design process and structure optimization. Using this approach, one can employ the transmission and reflection matrices of each metasurface obtained by full-wave simulation and apply the transfer matrix model to optimize other design parameters, such as rotation angles of metasurfaces, spacing layer thickness, etc. Furthermore, results obtained by the transfer matrix model show reasonably good agreement with the full-wave simulation results. More details of the transfer matrix model for anisotropic metasurfaces are provided later in the disclosure. Combining the transfer matrix method and full-wave simulation, it has been demonstrated that designed and optimized chiral metamaterials with high efficiency (80~90%) and high performance (CPER>100) for the wavelength range from 2 to 6 µm may be designed, as shown in FIG. 2I. FIG. 2I is a plot illustrating simulated transmission spectra (Top panel) and CPER (bottom panel) of LCPMs designed for different operational wavelengths from 2 to 6 µm. Mirror images of the LCPM designs result in RCPMs for corresponding wavelengths.

EXAMPLES

Figure 3A:
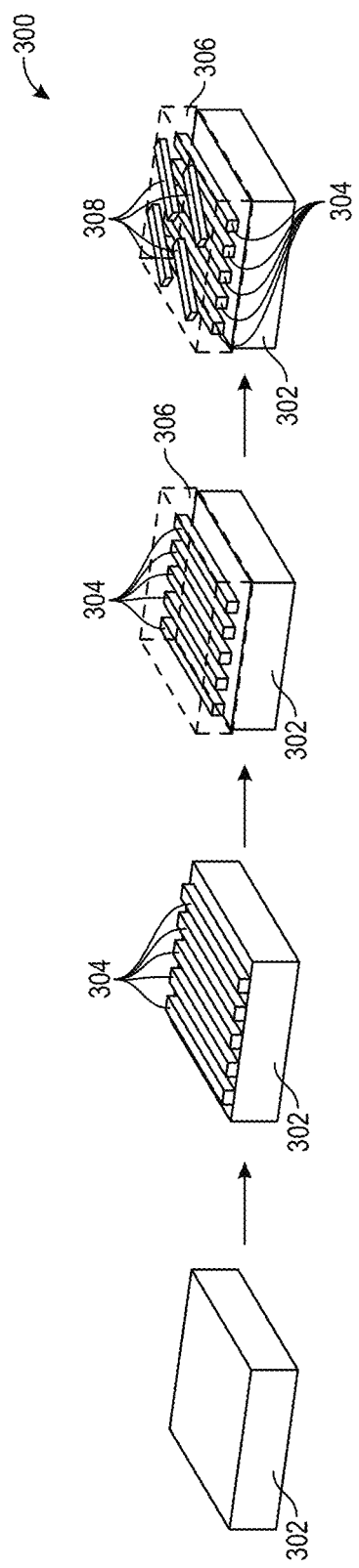
FIGS. 3A-3G represent device fabrication and characterization steps of chiral plasmonic metamaterial (CPM) devices, according to one or more embodiments disclosed.
Figure 3B:
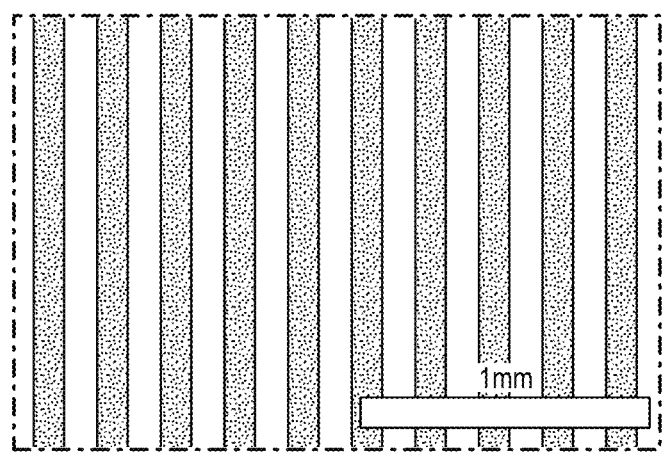
Figure 3C:
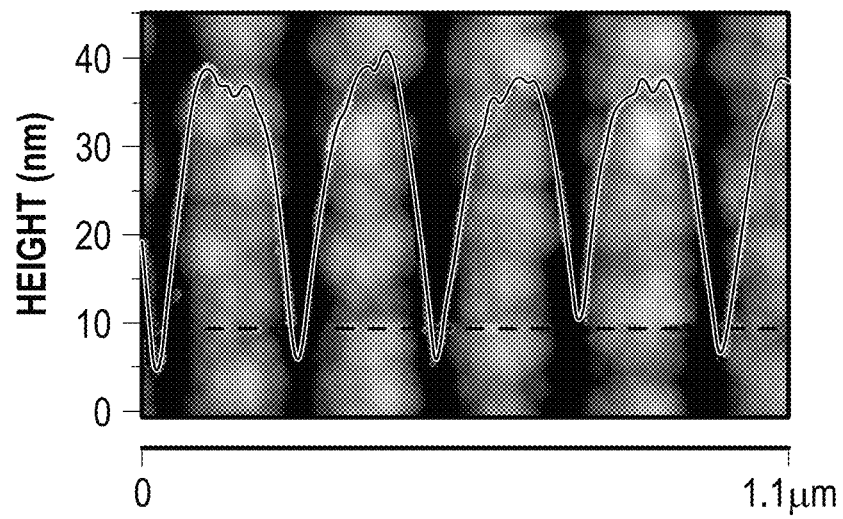
Figure 3D:
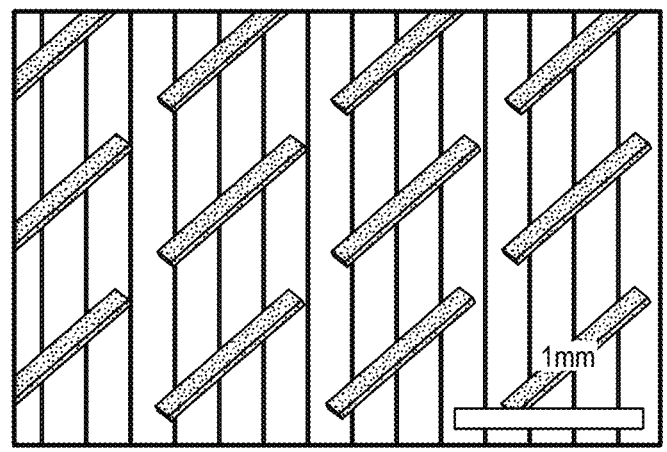
Figure 3E:
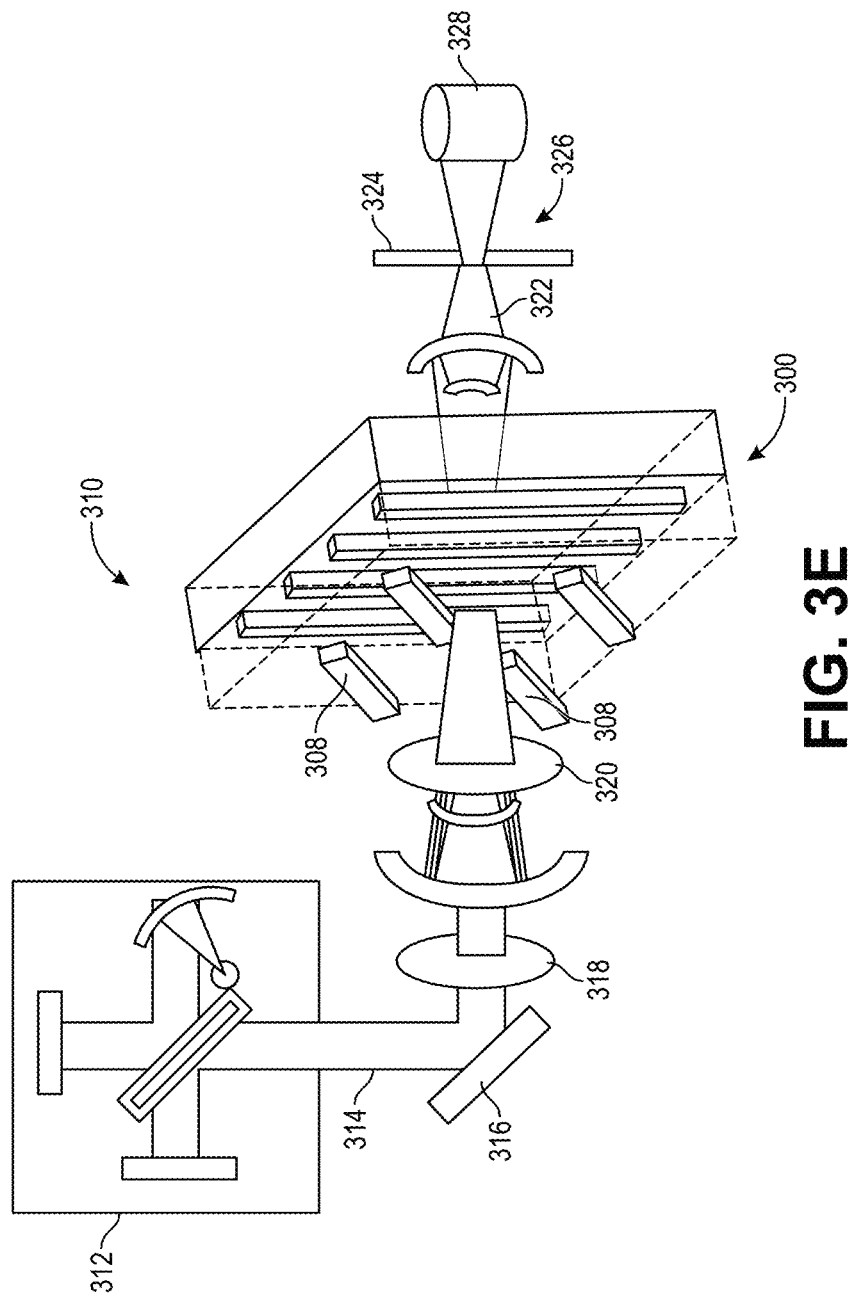
Figure 3F:
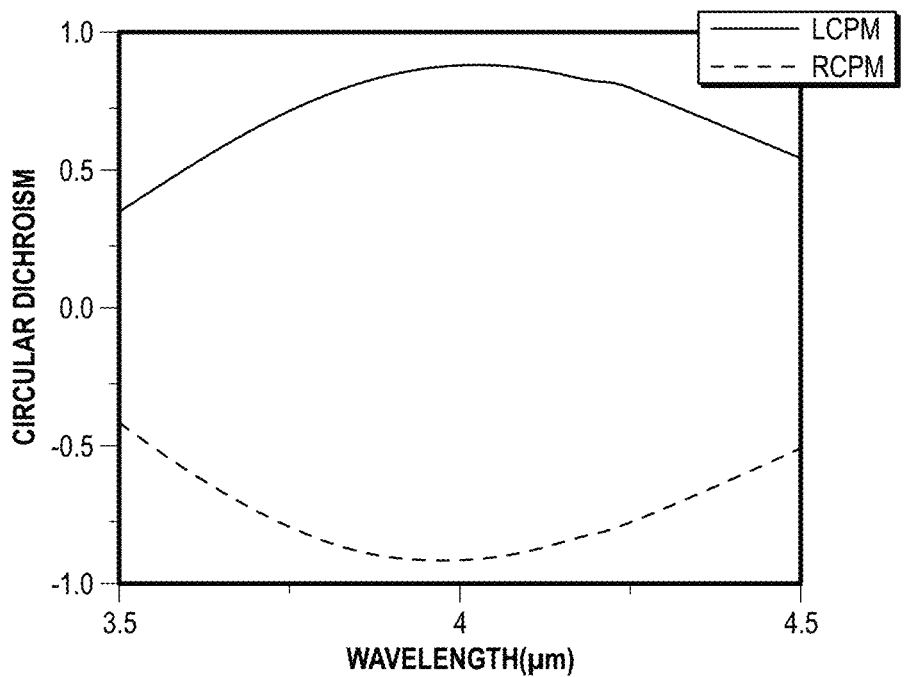
Figure 3G:
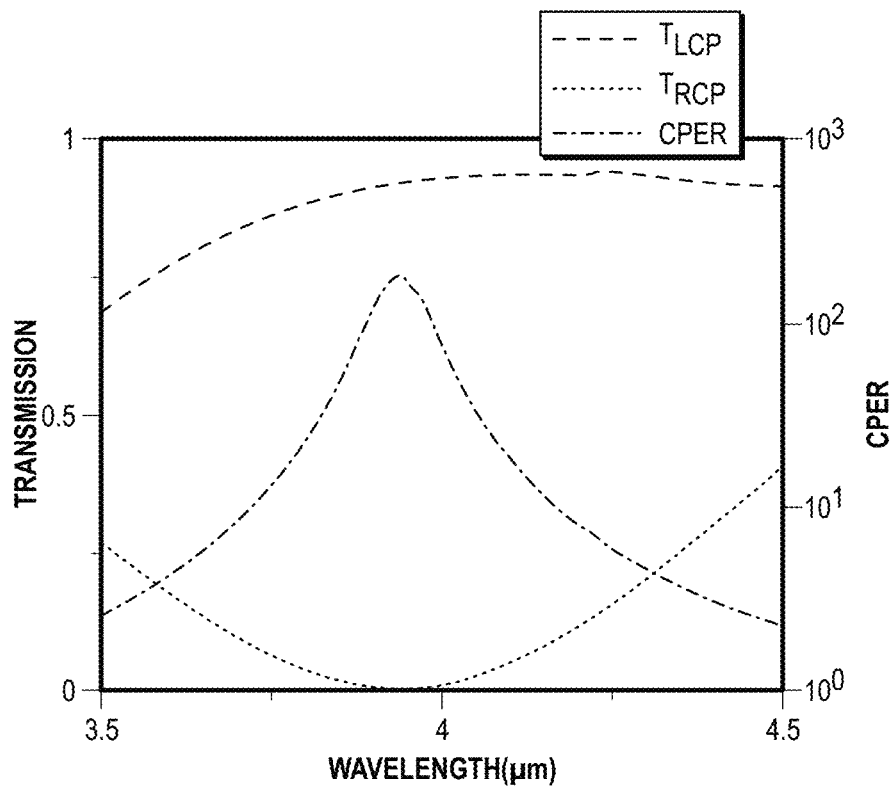

FIGS. 3A-3G represent device fabrication and characterization steps of chiral plasmonic metamaterial (CPM) devices, according to one or more embodiments disclosed. FIG. 3A is a flow chart of the device fabrication process. Based on the proposed CPM designs, the device with experimentally demonstrated subwavelength-thick highly efficient CPMs with strong chirality in the mid-IR wavelength range have been demonstrated. A device 300 was fabricated on a sapphire substrate 302 due to its high transmission up to 6 µm at mid-IR. Certain embodiments may utilize a substrate comprised of sapphire, fused silica, undoped silicon, zinc selenide, calcium fluoride, barium fluoride or other suitable materials with low optical insertion loss at the wavelengths of interest known in the art. FIG. 3A details the fabrication procedures. First, parallel gold nanogratings 304 (period: 230 nm; duty cycle: 50%; thickness: 130 nm) were patterned on top of the sapphire substrate 302 with electron beam lithography (EBL), metal evaporation (5 nm chromium and 125 nm gold) and lift-off. Certain embodiments may have non-parallel nanogratings, which may also be referred to as protrusions, or nanogratings made from gold, silver, aluminum, copper, palladium, platinum, and their alloys, doped semiconductors or other suitable plasmonic materials, for example, metals or metal-like materials that exhibit negative real permittivity at the wavelengths of interest known in the art. A scanning electron microscope (SEM) image of this fabrication step exhibiting the nanogratings 304 is shown in FIG. 3B, prior to SiOx deposition. Then a 350 nm-thick silicon oxide spacing layer 306 was deposited on top of the nanogratings 304 via sputtering. The purpose of the spacing layer is two-fold. First, it introduces proper propagation phase delay to achieve constructive or destructive interference for CP light with different handedness, as discussed previously in the design concept section. Secondly, it reduces the surface height fluctuation of the regions over the 130 nm thick nanogratings 304. The SiOx-covered nanograting region exhibits surface roughness Ra=11.4 nm, as shown in the atomic force microscopy (AFM) image in FIG. 3C, which is an image of the SiOx-covered nanogratings with height profile taken along the white dashed line perpendicular to nanogratings. Certain embodiments may have dielectric layers made from aluminum oxide, silicon oxide, silicon nitride, undoped semiconductors, Zinc selenide, Zinc oxide, calcium fluoride, barium fluoride, or other dielectric materials with low or zero optical loss at the wavelengths of interest. Next, the plasmonic gold nanoantenna 308 metasurface was patterned on top of and in direct contact with the spacer layer 306. Certain embodiments may have non-parallel nanoantenna protrusions, which may also be referred to as plasmonic bar antennas, or nanoantennas made from gold, silver, aluminum, copper or other plasmonic materials known in the art. Plasmonic materials are metals or metal-like materials that exhibit negative real permittivity. FIG. 3D shows a scanning electron (SEM) image of a portion of the fabricated nanoantenna array. The shape and dimension of the nanoantennas 308 were not significantly affected by the surface fluctuation. The fabricated devices were characterized with an infrared polarization-dependent spectroscopy setup 310 as shown in FIG. 3E. Unpolarized broadband light 314 from a Fourier transform infrared (FTIR) spectrometer 312 was converted to circularly polarized light with a linear polarizer 318 and a quarter-wave plate 320 (QWP) working around 4 µm (FIG. S4). The handedness of the CP light was controlled to be right-handed (or left-handed) by setting the angle between the optical axis of the linear polarizer and the fast axis of the QWP to be −45° (or 45°). Then the light was incident onto the CPM sample 300 and the transmitted light 322 was collected by a Mercury Cadmium Telluride (MCT) detector 328. The measured CD spectra of an LCPM and an RCPM device are shown in FIG. 3F. Design dimensions for the measured LCPM/RCPM were with nanoantenna having a length of 1000 nm/1030 nm, a thickness of 55 nm, and a period of 920 nm along both x and y axes. The nanogratings had a width of 115 nm, a period of 230 nm, and a spacer thickness of 350 nm. The measured CD was −0.92 at 3.97 µm for the LCPM device and 0.88 at 4.02 µm for the RCPM device as shown in FIG. 3F. FIG. 3G shows that the LCPM devices exhibit transmission over 90% and CPER over 180 at 3.94 µm. Its CPER is more than 20 over a wavelength range from 3.8 to 4.1 µm. The measured CPER at wavelengths other than 4 µm is affected by the non-ideal CP input due to the limited bandwidth of the available quarter wave plate. Taking into account the non-ideal CP input, the measurement results of FIG. 3G were analyzed and the extracted transmission and CPER were obtained for the device, which show slightly improved CPER for all wavelengths. In certain embodiments, substrates can be fabricated using other materials with low optical insertion loss for the wavelength of interest, for example, fused silica, quartz, glass or even transparent plastic substrates in visible wavelengths, zinc selenide (ZnSe), silicon or other semiconductor substrate for infrared wavelengths, and combinations thereof. Certain embodiments may also use nanogratings comprised of use metals such as gold, silver, aluminum, copper, their metal alloys, and combinations thereof. Doped semiconductors can also be used for longer wavelengths where their optical response exhibit the features of plasmonic materials (negative real part of permittivity). Certain embodiments may employ nanoantennas made from metals such as gold, silver, aluminum, copper, their metal alloys, or combinations thereof.

Polarization Conversion

FIGS. 4A-4F illustrate polarization state conversion setup, simulation, and measurements for CPM structures, according to one or more embodiments disclosed.

Figure 4A:
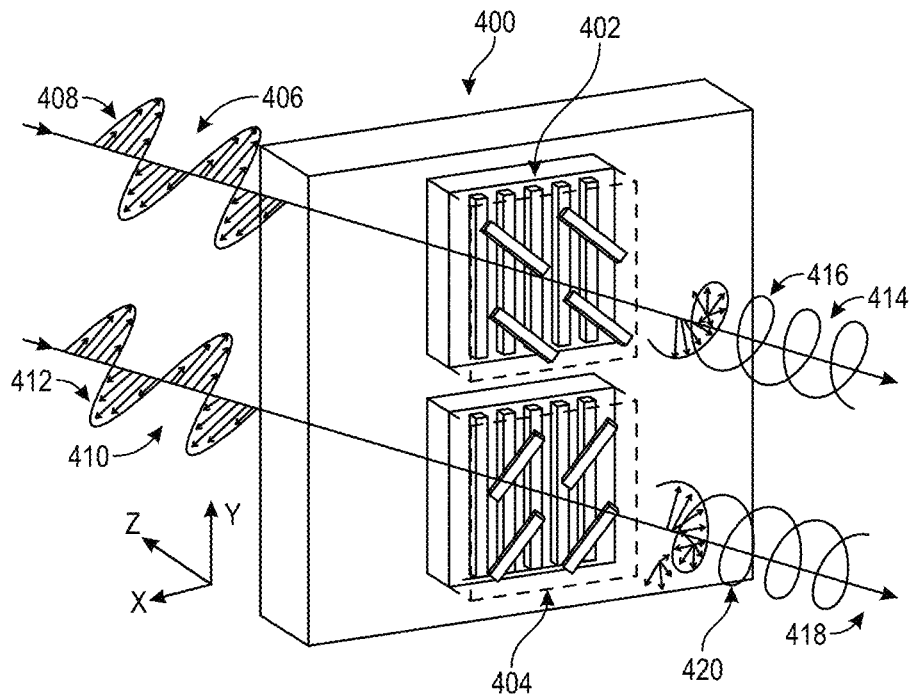
FIGS. 4A-4F illustrate polarization state conversion setup, simulation, and measurements for CPM structures, according to one or more embodiments disclosed.

Conventional methods for polarization conversion utilize birefringent crystals, Faraday rotation, total internal reflection or Brewster angle reflection, which requires bulky optics and limits system integration. Ultra-compact polarization conversion devices have been demonstrated based on chiral plasmonic metamaterial and metasurface structures as well as dielectric metasurfaces. Embodiments of disclosed CPMs can be used for polarization conversion from linear to circular and elliptical polarization states with record-high conversion efficiency in transmission mode. FIG. 4A is a schematic of a polarization state conversion from linear polarization to elliptical polarization by the RPC (top) and LPC (bottom) devices based on right chiral plasmonic metamaterial (RCPM) and left chiral plasmonic metamaterial LCPM structures, respectively. The conversion process from linearly polarized (LP) to CP and elliptically polarized light with different handedness is illustrated. A polarization state conversion device 400 having a RCPM structure 402 and a LCPM structure 404 is shown. Linear polarized (LP) light 406, 410 with electrical field vector oriented 408, 412 along the x-axis was incident first onto the nanograting metasurface of the polarization state conversion device 400 (oriented along the y-axis) and then onto the nanoantenna metasurface. The transmitted elliptically oriented light 414, 418 is also shown in FIG. 4A.

Figure 4B:
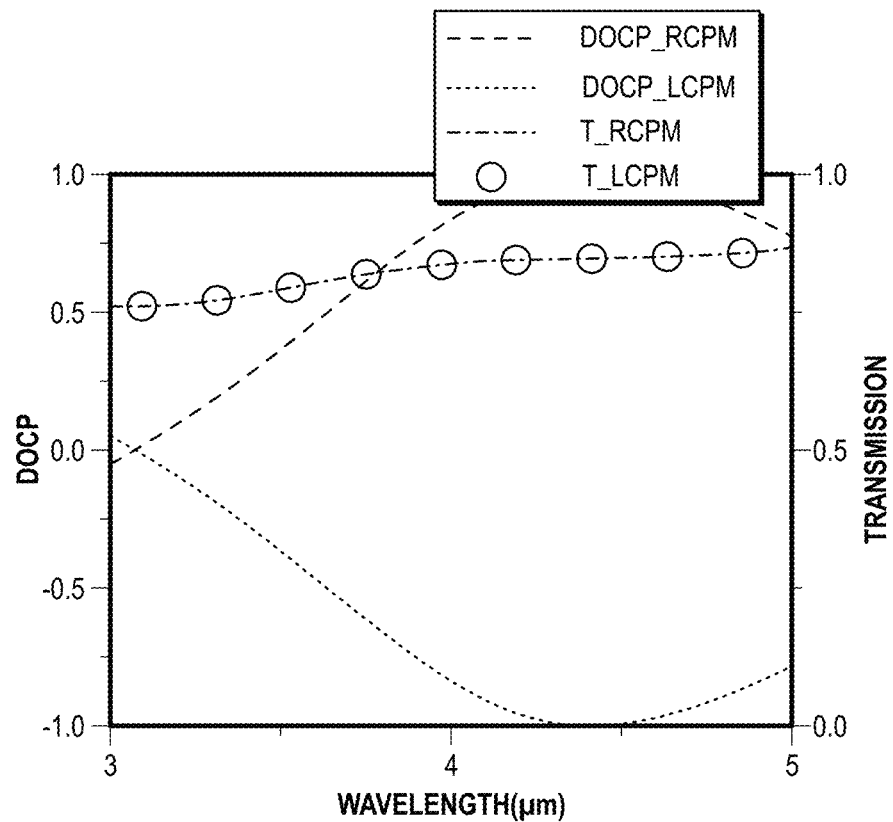
Figure 4C:
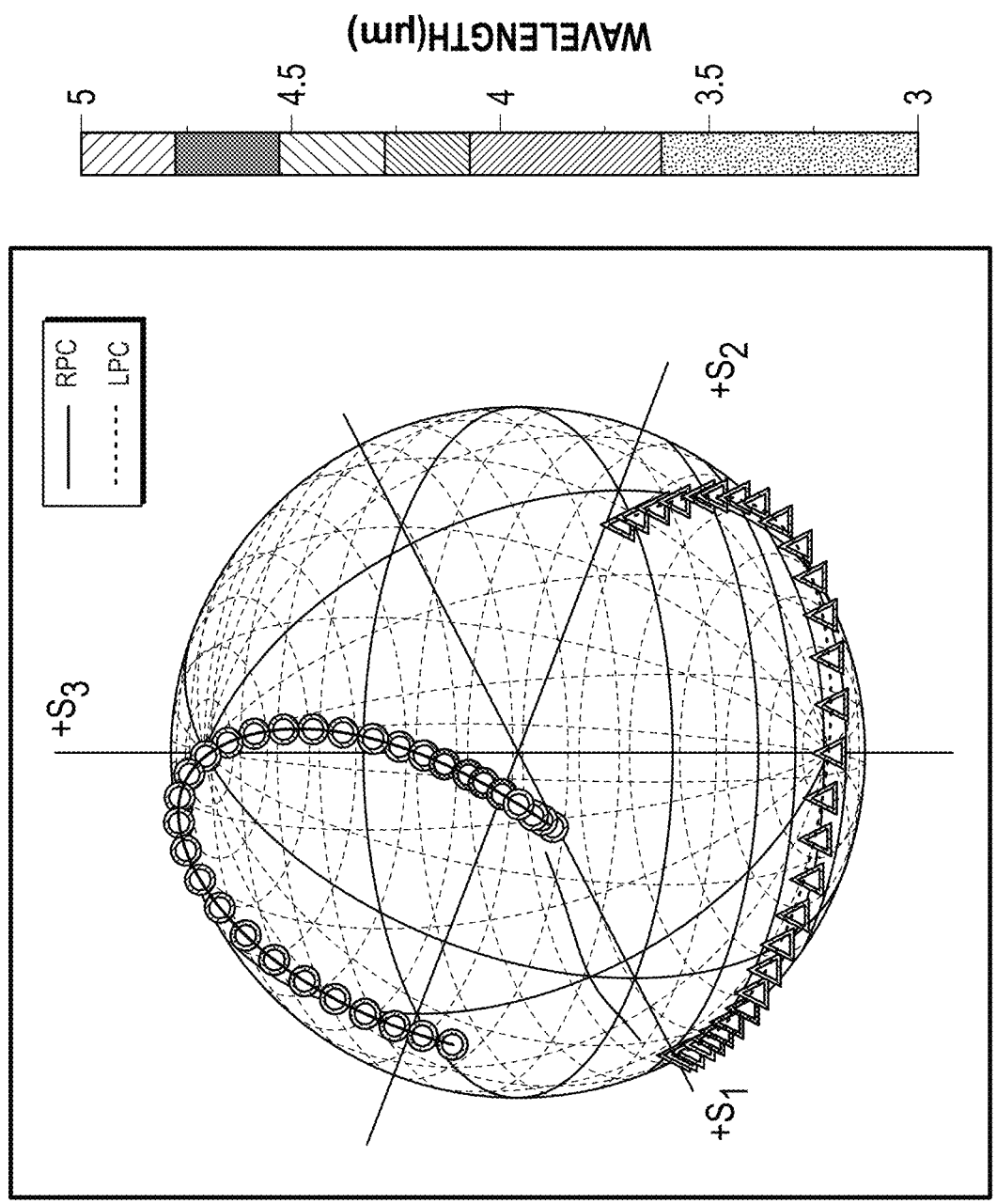

FIG. 4B is a plot showing the simulated degree of circular polarization (DOCP) and transmission spectra of polarization converters based on LCPM and RCPM designs, respectively. The left-handed polarization converter (LPC) based on LCPM converts LP input light to LCP light with DOCP~−0.99996 and conversion efficiency >90% while the Right-handed polarization converter (RPC) based on RCPM converts LP input light to RCP light with DOCP~0.99996 at wavelength ~4.4 μm. The output polarization state varies with the input light wavelength. As the wavelength varies from 3 to 5 μm, the output polarization state exhibits DOCP ranging from −0.99996 to 0 for the LPC and from 0 to 0.99996 for the RPC with reasonably high conversion efficiencies (~75% to 90% depending on the wavelengths). FIG. 4C is a plot of the converted polarization states generated by RPC (solid line) and LPC (dashed line) at different wavelengths (as indicated in the legend) on a Poincare sphere for both devices. The converted polarization states by the LPC and RPC devices form continuous traces on the Poincare sphere connecting the north/south pole and the equator. The proposed CPM structure can perform a similar function to the combination of a linear polarizer and a low-order QWP, yet, with a total thickness of about 550 nm (<1/7 of the operation wavelength).

Figure 4D:
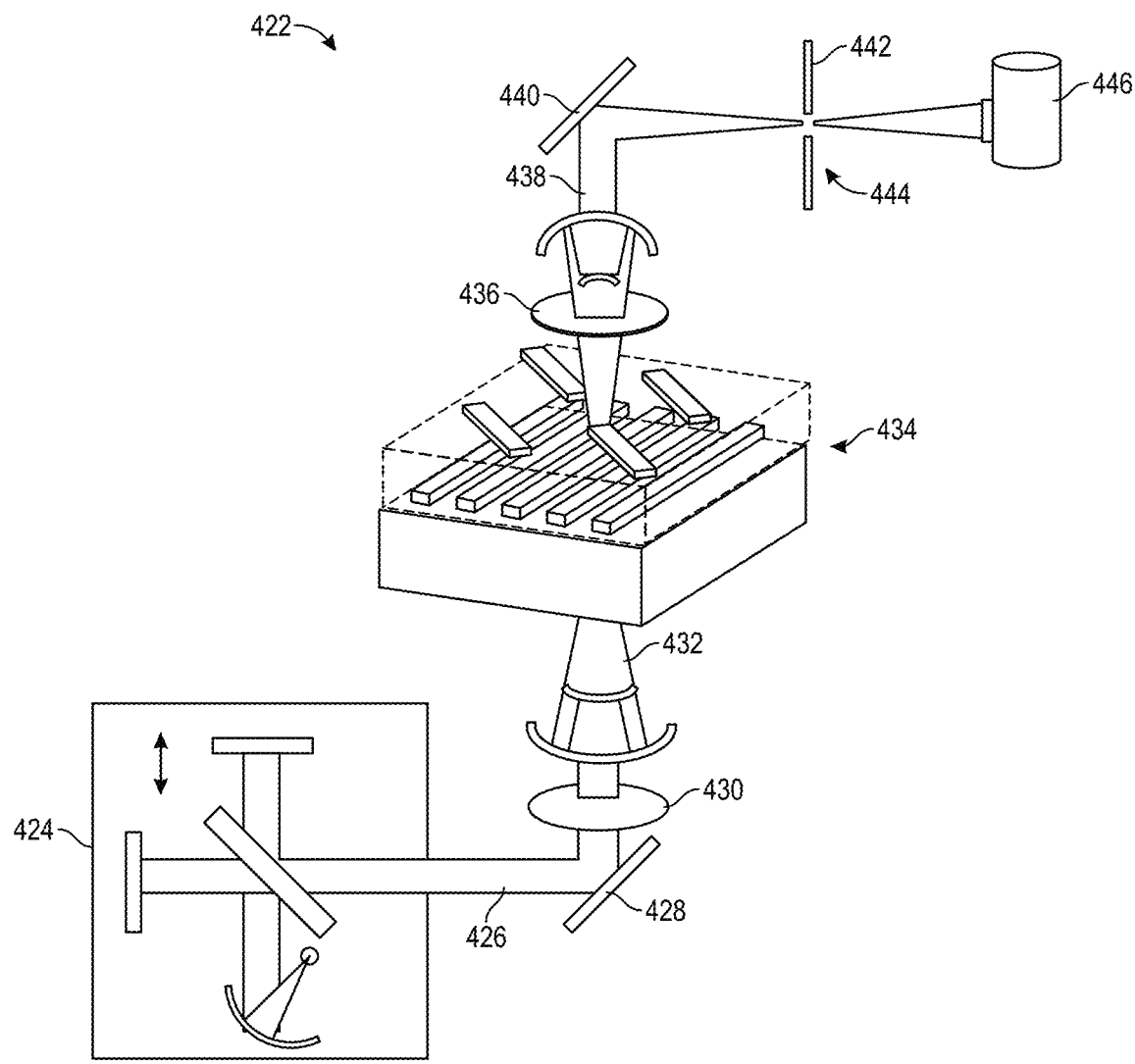
Figure 4E:
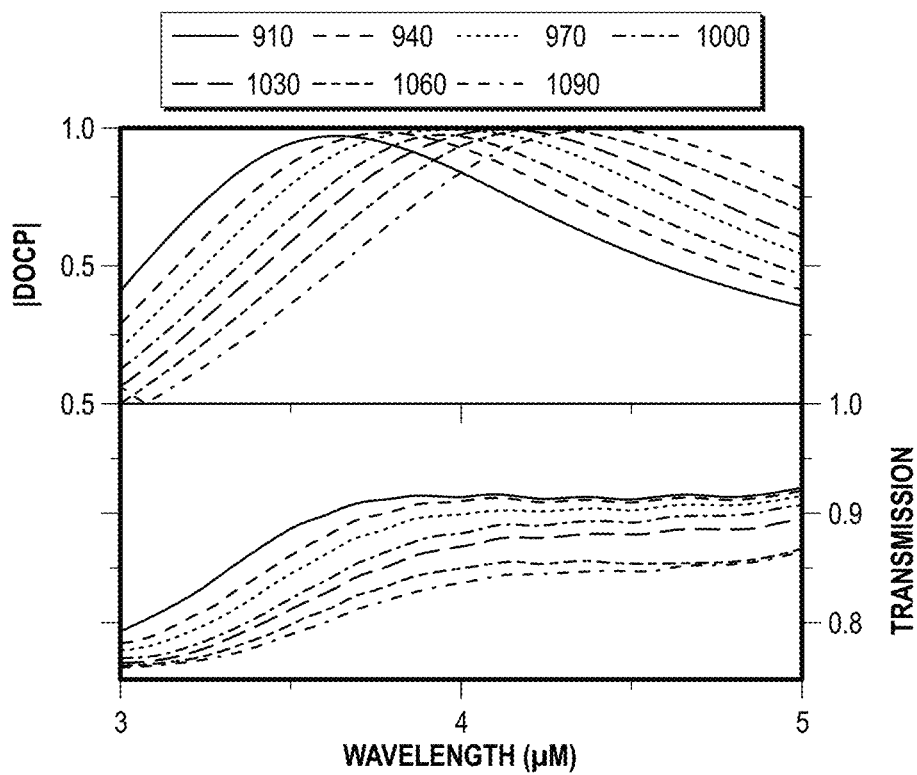
Figure 4F:
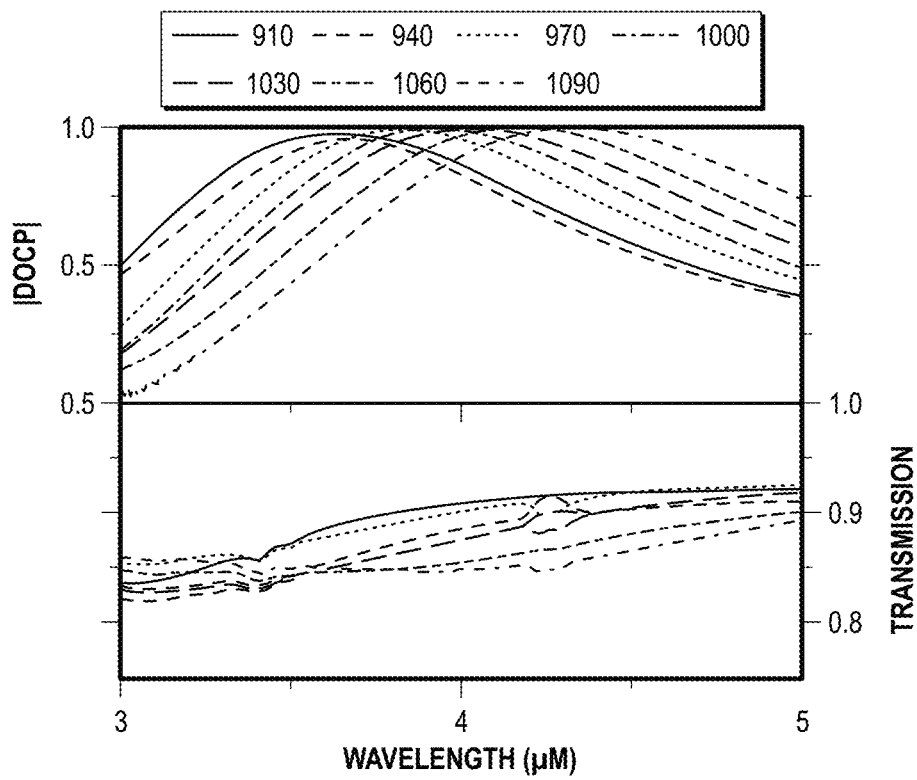

FIG. 4D is a schematic of the measurement setup for polarization generation. 4D measurement setup for polarization generation 422. Unpolarized light 426 from the FTIR spectrometer 424 was first converted to LP light 432 using a linear polarizer 430 oriented perpendicular to the nanogratings, then incident onto the device 434 from the nanograting metasurface side. The transmitted light 438 was collected by an MCT detector 446 to obtain the transmission spectra. The polarization state of the transmitted light 438 was characterized by a polarization state analyzer (PSA) to obtain the Stokes parameters and DOCP, as is discussed later. FIGS. 4E and 4F are plots showing simulated (FIG. 4E) and measured (FIG. 4F) DOCP and transmission of the polarization converter devices for different wavelengths, respectively. Design dimensions of the nanoantenna used were a length of 910 nm (LPC), 940 nm (LPC), 970 nm (LPC), 1000 nm (RPC), 1030 nm (LPC), 1060 nm (LPC), and 1090 nm (LPC). Nanoantenna dimensions used were a width of 100 nm, a thickness of 55 nm, and a period of 920 nm along both x and y-axes. Nanograting dimensions were a width of 115 nm, a period of 230 nm, and a spacer thickness of 350 nm. The measurement results (FIG. 4F) for LPC and RPC devices with different design parameters show reasonably good agreement with simulation results (FIG. 4E). The DOCP curves exhibit dispersive behavior as wavelength varies and the wavelengths for LP to CP conversion can be tuned by changing the length of nanoantennas. The demonstrated polarization converters exhibit efficiency higher than 82% from 3 to 5 μm according to measurement results. One of the best polarization converters designed with nanoantenna length 1090 nm exhibits conversion efficiency over 86% for all wavelengths from 3 to 5 μm and generates close to perfect CP polarization state (DOCP=−0.99998) at 4.35 μm. One can optimize a polarization converter design to generate the desired polarization state at any wavelength of interest by varying the design parameters, such as the metasurface design, the spacer thickness as well as the rotation angle between the two metasurfaces. Moreover, different designs can be integrated onto the same substrate to realize pixelated control of polarization states with spatial resolution down to a few micrometers.

Full-Stokes Polarization Detection

Figure 5A:
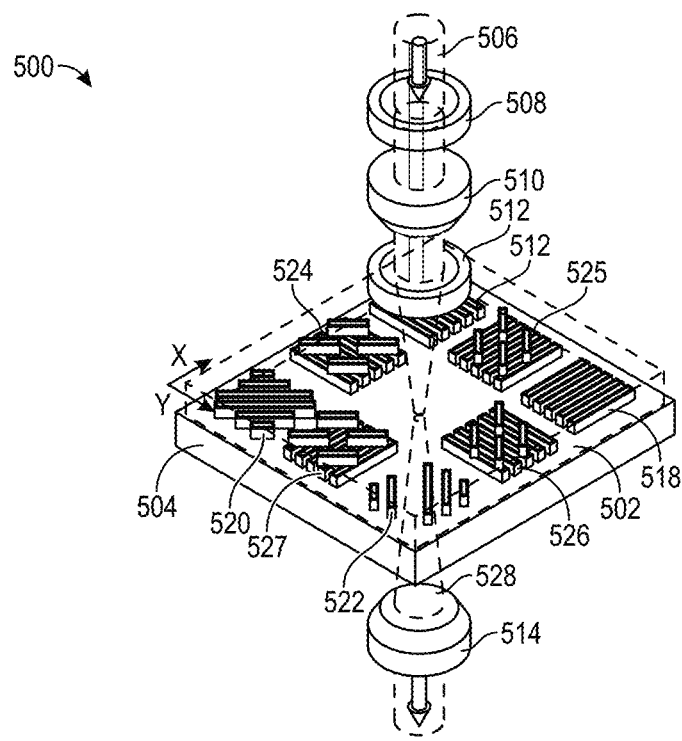
FIGS. 5A-5D illustrate the detection of Full Stokes parameters, according to one or more embodiments disclosed.
Figure 5B:
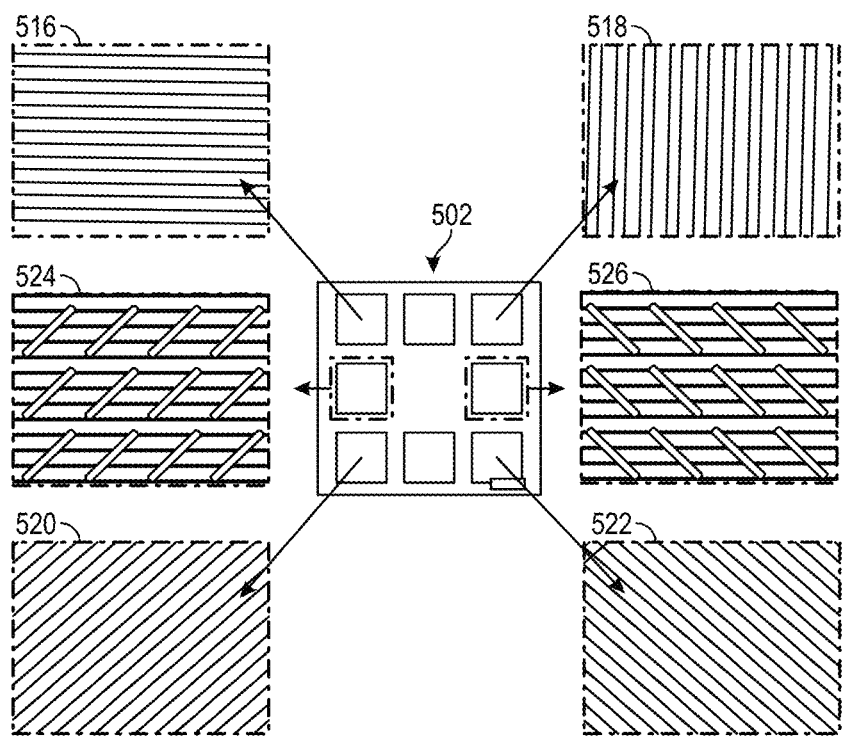

FIGS. 5A-5D illustrate the detection of Full Stokes parameters, according to one or more embodiments disclosed. Various chiral metamaterial and metasurface structures may be applied to realize ultra-compact devices for polarization detection from visible (VIS) to mid-infrared (mid-IR) wavelengths. The compactness and design flexibility of such devices are highly desirable for a wide range of applications, including biomedical diagnosis, chemical analysis, optical communication, astronomy and target detection. Yet, most of the devices are still limited by low measurement accuracy, efficiency and narrow operation wavelength range. Here based on the certain embodiments of CPM structures, an ultra-compact chip-integratable full-stokes polarization detection device has been demonstrated with the record-high measurement accuracy and broadband coverage in the mid-IR wavelength range from 3.5 to 5 μm. FIG. 5A is a schematic of a detection device 500 having an array of pixels or devices 500 used in the detection of Full Stokes parameters, according to one or more embodiments disclosed. The device 500 has a pixel array 502, which may also be referred to as a superpixel, super-pixel array device, or integrated polarization filter array. The pixel array 502 is coupled to a motorized stage 504 configured to move with respect to an x-axis and a y-axis. The device 500 design is based on the spatial division concept and consists of six chip-integrated microscale polarization filters (FIG. 5A, $P_1$ 516; $P_2$ 518; $P_3$ 520; $P_4$ 522; $P_5$ 524; $P_6$ 526). Four linear polarization filters, $P_1$ 516; $P_2$ 518; $P_3$ 520; $P_4$ 522, composed of gold nanogratings were used to selectively transmit LP light with electric field vectors oriented at angles of 90° ($P_1$), 0° ($P_2$), −45° ($P_3$) and 45° ($P_4$) with respect to the x-axis. Two circular polarization filters, $P_5$ 524; $P_6$ 526, based on LCPM ($P_5$) and RCPM ($P_6$) were used to selectively transmit LCP and RCP light, respectively. One empty cell ($P_0$) without any patterned structures is located in the center to collect total light intensity ($I_0$). $P_5'$525 and $P_6'$527 were used as backups for $P_5$ and $P_6$, respectively. Unpolarized light 506 from an FTIR went through a linear polarizer 508 and QWP 512 to generate an arbitrary input polarization state. Next, the light went through the device 500 on the motorized stage 504 and was collected by an MCT detector connected to the FTIR. FIG. 5B is a top view showing the integrated polarization filter array as shown in FIG. 5A. SEMs of one polarization detection unit 502 in the center with LP filters based on nanogratings oriented at four angles 0° ($P_1$ 516), 90° ($P_2$ 518), 45° ($P_3$ 520), −45° ($P_4$ 522), as well as CP filters based on RCPM ($P_5$ 524) and LCPM ($P_6$ 526).

First, a widely used simple method was adopted to obtain Stokes parameters ($S_0$, $S_1$, $S_2$, $S_3$) by measuring the intensity of linear and circular polarization components ($I_1$ to/$I_6$) with the polarization filter array ($P_1$ to $P_6$). For simplicity, relative Stokes parameters were used in the following discussion.

$$\begin{cases} S_0 = 1 \\ S_1 = (I_2 - I_1)/I_0 \\ S_2 = (I_4 - I_3)/I_0 \\ S_3 = (I_6 - I_5)/I_0 \end{cases} \quad (1)$$

In the experiment, the response of each polarization filter was first measured to obtain the insertion loss for the corresponding polarization state it transmits (see method section for details). Then various additional input polarization states were generated by changing the rotation angle of the linear polarizer and QWP (operation wavelength around 4 μm). For each input polarization state, transmitted light through all six polarization filters was collected onto an MCT detector sequentially while moving the motorized stage as described previously in regard to FIG. 5A. It should be noted that it is possible to simultaneously collect light transmitted through all polarization filters at a single shot with an infrared imaging sensor, in alternate embodiments. Based on the measured light intensity, each polarization component of input light was obtained, i.e., $I_0$ to $I_6$, taking into account the measured insertion loss of the polarization filters. Finally, the Stokes parameters of the incident light were calculated using Eq. (1). To evaluate the measurement accuracy, the input polarization states were characterized with a PSA as will be discussed later.

Figure 5C:
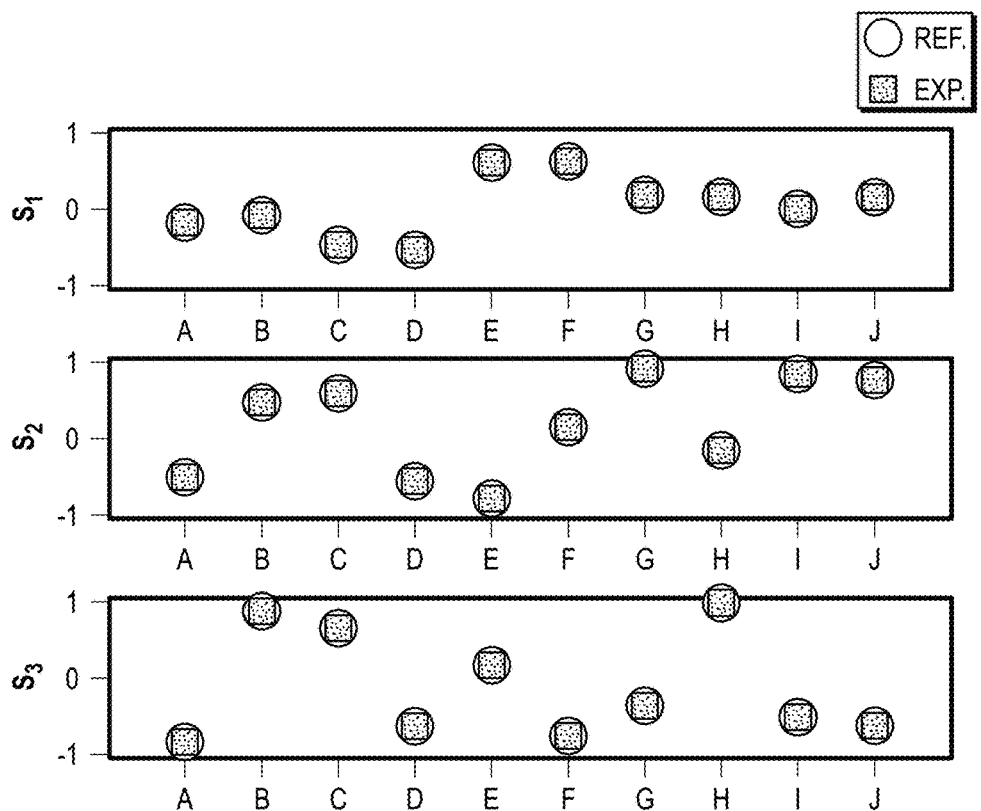
Figure 5D:
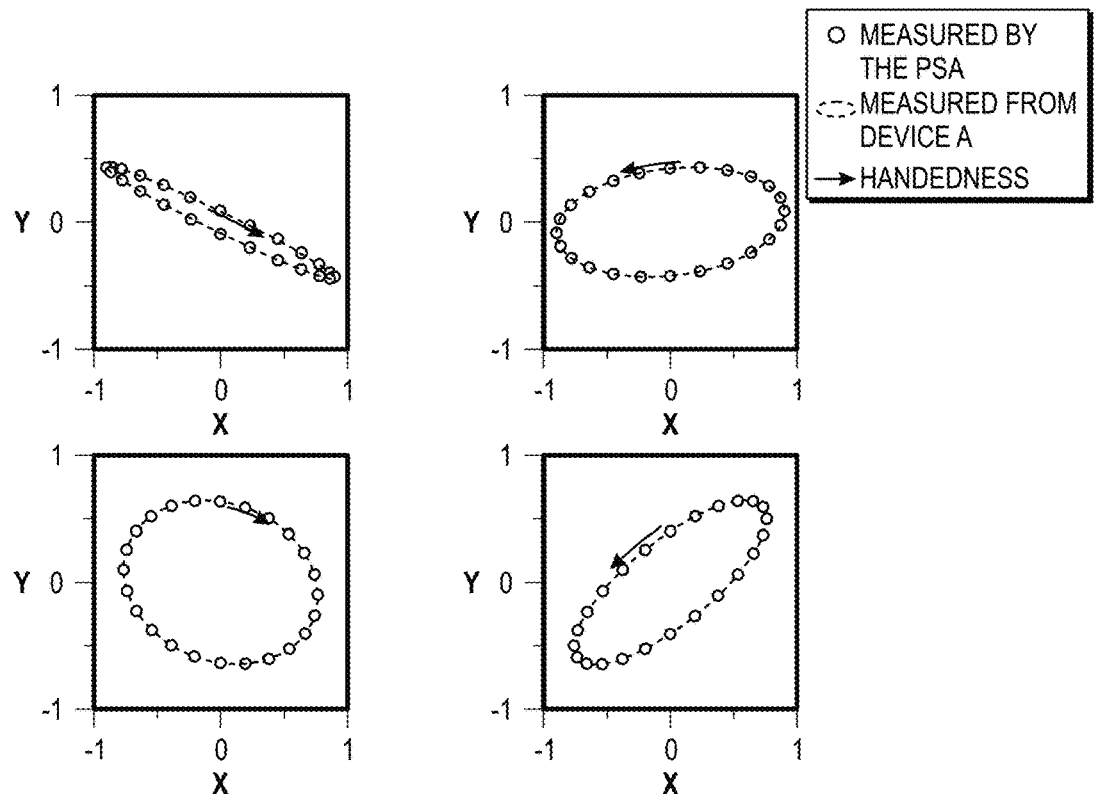

FIG. 5C is a plot showing a comparison between the measured Stokes parameters obtained by the device (at 4.077 μm) according to embodiments described in FIGS. 5A and 5B (denoted by Exp.), and reference values (Ref) obtained by the PSA for the same 10 different polarization states. The ellipse plots for four polarization states are shown in FIG. 5D, with arrows indicating the handedness of polarization states. Measurements by the PSA are indicated by the solid circle while measurements using the device A as shown in FIG. 5A are indicated by the dashed lines. The average measurement errors for $S_1$, $S_2$, $S_3$ are 0.0044, 0.014 and 0.0079, respectively, and the measurement errors for DOCP and degree of linear polarization (DOLP) are 0.0079 and 0.015, respectively. These devices as fabricated according to embodiments herein have shown the highest measurement accuracy among all metasurface/metamaterial-based full-Stokes polarization detection devices reported in the literature to date. The measurement accuracy is limited by the linear polarization extinction ratio (LPER, the ratio between $T_{max}$ and $T_{min}$ with LP input light oriented perpendicular or along the nanogratings)/CPER of the linear polarization filters/circular polarization filters; therefore, despite the simplicity and trivial computation requirements, this method can only provide high measurement accuracy over a limited wavelength range (~100 nm), over which the circular polarization filters exhibit high CPER (>100). To achieve high-accuracy polarization measurement over a broad wavelength range, another method has also been developed based on the Muller matrix for polarization detection over the whole wavelength range from 3.5 to 5 μm.

Figure 6A:
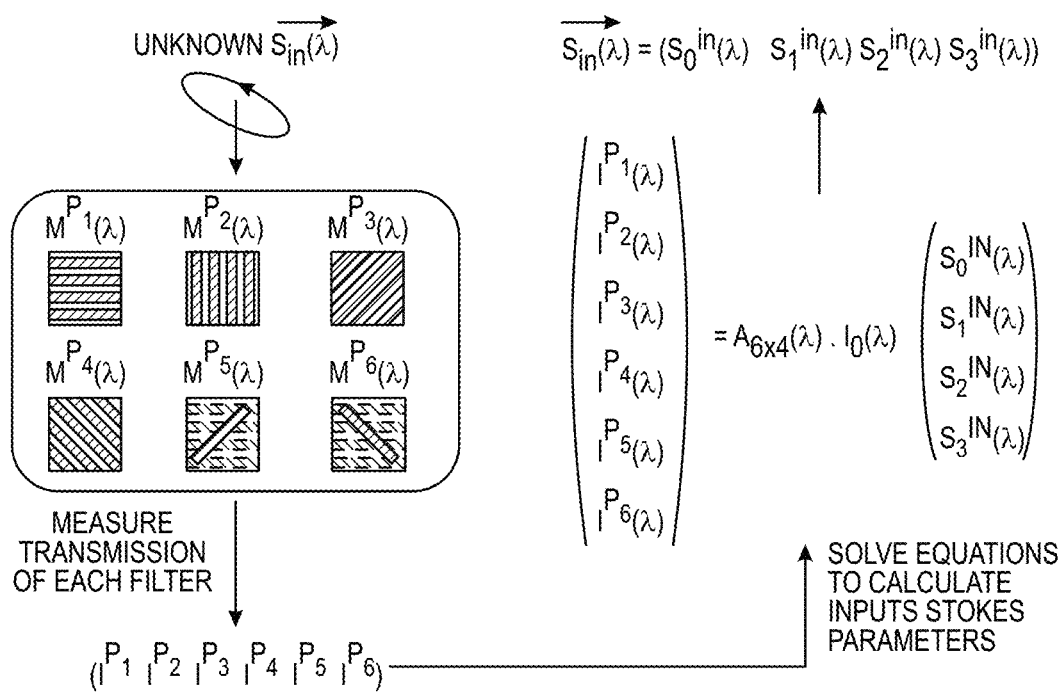
FIGS. 6A-6D illustrate a broadband polarization detection process based on the Muller matrix method, according to one or more embodiments disclosed.
Figure 6B:
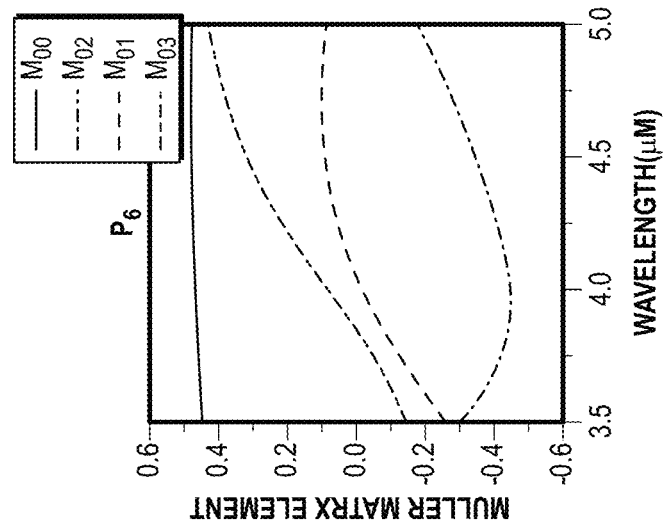
Figure 6B:
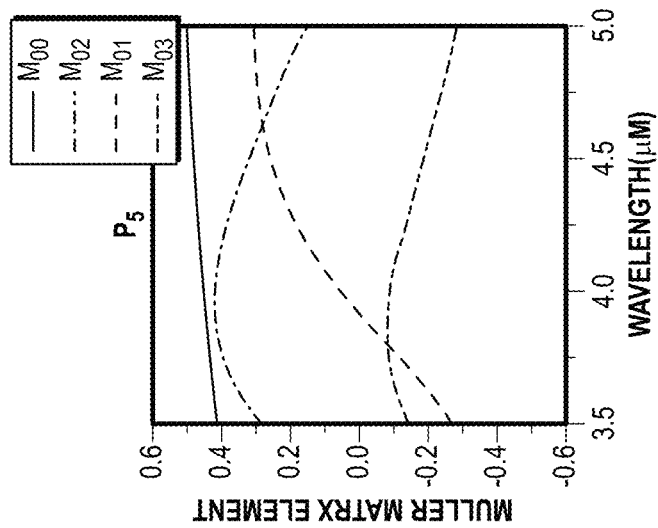
Figure 6B:
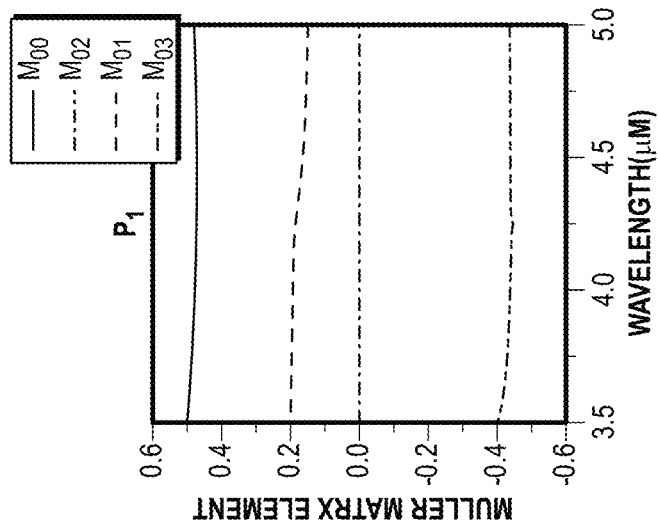
Figure 6C:
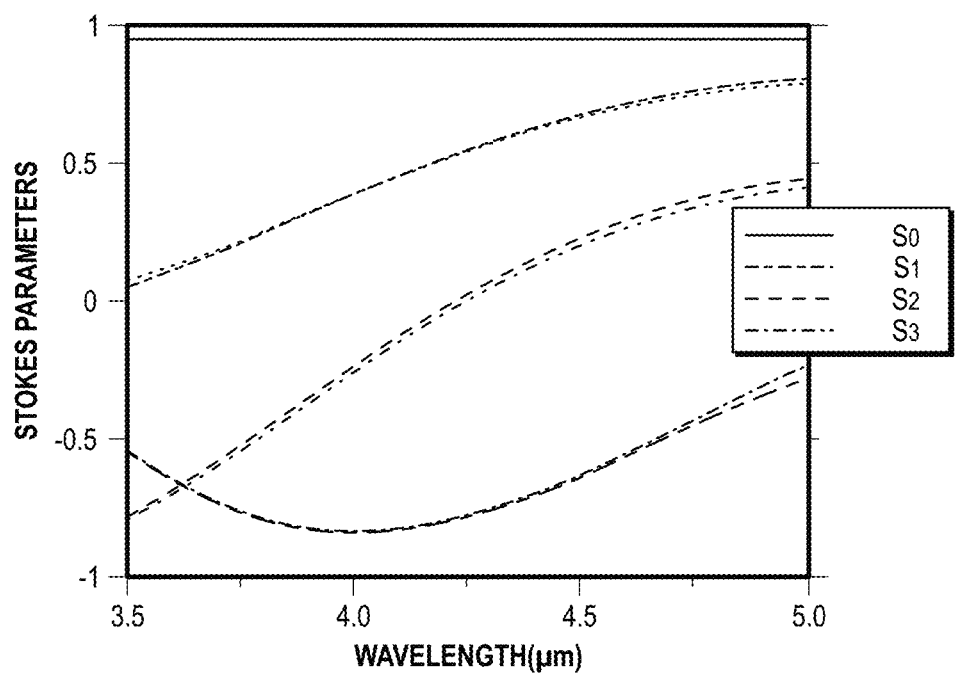
Figure 6D:
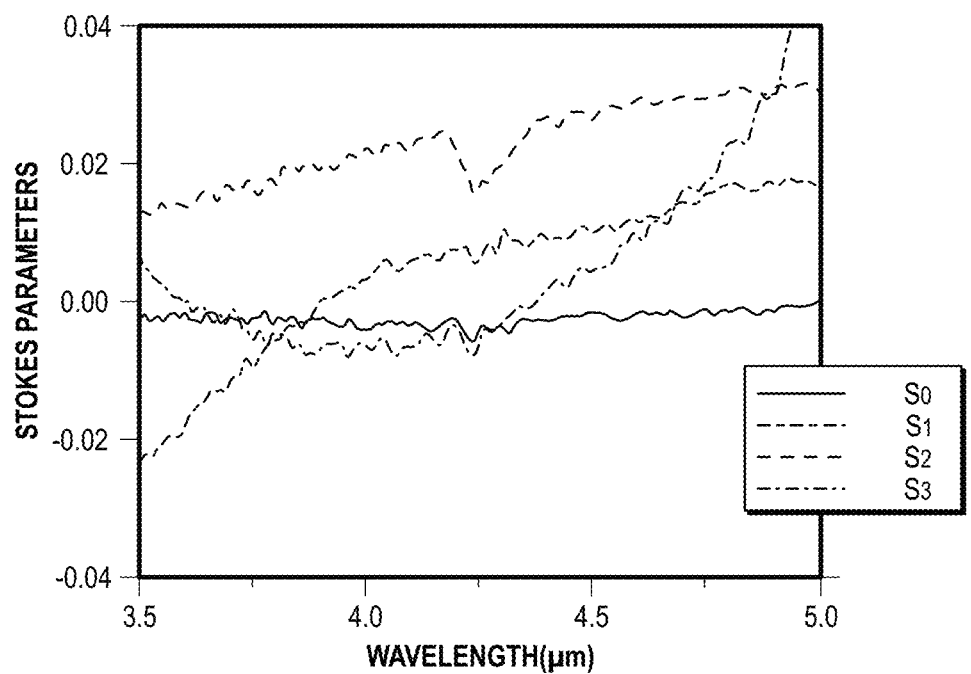

FIGS. 6A-6D illustrate a broadband polarization detection process based on the Muller matrix method, according to one or more embodiments disclosed. FIG. 6A illustrates a flow chart for broadband polarization detection process based on the Muller matrix method. The transmission of normal incident light with unknown polarization states through each of the detection units is measured with FTIR. Then based on Muller Matrix calculation, the input polarization states may be calculated. FIG. 6B illustrates several Muller matrix elements (on the first row) of polarization filters $P_1$ (left), $P_5$ (middle) and $P_6$ (right). FIG. 6C is a plot showing Broadband Stokes parameter measurement results obtained by the PSA (solid line, Ref.) and the device according to certain embodiments (dashed line, Exp.) for different polarization states from 3.5 μm to 5 μm. FIG. 6D is a plot showing measurement errors for Stokes parameters as a function of wavelength (corresponding to measurement results presented in FIG. 6C).

FIG. 6A illustrates a Muller-matrix-based method including a flow chart, according to embodiments described herein. Before measuring an arbitrary input polarization state, the Muller matrix elements shown on the first row of FIG. 6A for each polarization filter may be determined with a set of calibrated polarization states as input, as will be described in further detail later. FIG. 6B shows extracted Muller matrix elements for the LP ($P_1$), LCP ($P_5$) and RCP ($P_6$) filters shown in FIGS. 5A and 5B over the wavelength range from 3.5 to 5 μm. To characterize an unknown polarization state ($\vec{S}_{in}=(S_0, S_1, S_2, S_3)$) for each wavelength $\lambda$, the transmitted light intensity was measured through each filter in sequence with the FTIR and a motorized stage. Similar to an instrument matrix method for division-of-amplitude photopolarimeter, the relation between the output intensity through the six polarization filters ($I^{P_1}(\lambda)$, $I^{P_2}(\lambda)$, $I^{P_3}(\lambda)$, $I^{P_4}(\lambda)$, $I^{P_5}(\lambda)$, $I^{P_6}(\lambda)$) and the input polarization state $\vec{S}_{in}(\lambda)$ can be described by the following equation.

$$\begin{pmatrix} I^{P_1}(\lambda) \\ I^{P_2}(\lambda) \\ I^{P_3}(\lambda) \\ I^{P_4}(\lambda) \\ I^{P_5}(\lambda) \\ I^{P_6}(\lambda) \end{pmatrix} = A_{6\times 4}(\lambda) \cdot I_0(\lambda) \begin{pmatrix} S_0(\lambda) \\ S_1(\lambda) \\ S_2(\lambda) \\ S_3(\lambda) \end{pmatrix} \quad (2)$$

where $I_0(\lambda)$ is the input light intensity obtained by the empty cell $P_0$; and the instrument matrix $A_{6\times4}(\lambda)$ is formed by the Muller matrix elements of all six polarization filters obtained previously:

$$A_{6\times4}(\lambda) = \begin{pmatrix} M_{00}^{P1} & M_{01}^{P1} & M_{02}^{P1} & M_{03}^{P1} \\ M_{00}^{P2} & M_{01}^{P2} & M_{02}^{P2} & M_{03}^{P2} \\ M_{00}^{P3} & M_{01}^{P3} & M_{02}^{P3} & M_{03}^{P3} \\ M_{00}^{P4} & M_{01}^{P4} & M_{02}^{P4} & M_{03}^{P4} \\ M_{00}^{P5} & M_{01}^{P5} & M_{02}^{P5} & M_{03}^{P5} \\ M_{00}^{P6} & M_{01}^{P6} & M_{02}^{P6} & M_{03}^{P6} \end{pmatrix} \quad (3)$$

During the experiment, an incident beam was generated with different polarization states from 3.5 to 5 µm with a linear polarizer and a low-order QWP. Since the retardance of the QWP is dispersive, the generated beam will have different Stokes Parameters at different wavelength. The transmitted light intensity was measured through all 6 polarization filters to obtain the vector on the left of Eq. (2). According to the Rouché-Capelli theorem, the existence of a unique solution of Eq. (2) requires the rank of the matrix $A_{6\times4}(\lambda)$ to be 4, which can be satisfied as long as the LPER/CPER is not equal to 1 at the wavelengths of interest. In practice, since the noise is unavoidable during measurement, Large LPER and CPER would be desirable to achieve high measurement accuracy. FIG. 6C illustrates the measured Stokes parameters using devices according to embodiments herein from 3.5 λm to 5 µm, which agrees well with the reference values obtained by the PSA. The corresponding measurement errors of all Stokes parameters are shown in FIG. 6D. The measurement method achieved small measurement errors over the entire 3.5 to 5 µm wavelength range. The averaged absolute errors $$\left(\frac{1}{n}\sum_{i=1}^{n}|S_{ref.} - S_{exp.}|\right)$$

for $S_1$, $S_2$ and $S_3$ are 0.01, 0.022 and 0.008, from 3.5 to 5 µm. The corresponding measurement errors for DOCP and DOLP were 0.009 and 0.016, respectively. The measurement errors can be further reduced by increasing extinction ratios of the polarization filters and improving measurement accuracy of the Muller matrix of the polarization filters.

The results illustrated in FIGS. 6A-6D demonstrate that the Muller matrix method allows highly accurate measurement of polarization state over a broad wavelength range with a set of rigorous calculation procedures; while for single wavelength measurement, the first method described in regard to FIGS. 5A-5D is much simpler and faster. Both methods can be used for single-shot full-stokes polarization detection by integrating these polarization filter arrays directly with photodetector arrays or imaging sensors; thus, they are promising for ultra-compact polarization detectors or imaging sensors with high speed, high accuracy and broadband wavelength coverage.

In embodiments described herein, design strategies are demonstrated for realizing high performance chiral plasmonic metamaterials based on anisotropic thin-film interferences effects facilitated by metasurface structures. The chiral effects are enhanced while simultaneously minimizing the optical loss, which has been one of the major limitations for various plasmonic devices. The resulting CPM structures obtain high efficiency (>90%), large CD and CPER (up to 180) and subwavelength thickness (<λ/7), which outperforms all reported chiral metamaterial/metasurface structure known in the art. Certain embodiments of CPMs have been utilized in device applications, such as circular polarization filter, polarization conversion and full-Stokes polarization detection. The circular polarization filters were featured with simultaneously high CPER (up to 180) and transmission efficiency (>90%). The polarization converters exhibited high polarization conversion efficiency (~90%) from LP to CP and elliptically polarized light and produced near-perfect CP light with DOCP up to 0.99998. By integrating the circular polarization filters with nanograting-based linear polarization filters on the same chip, full-Stokes polarization detection is demonstrated with record-high measurement accuracy (measurement error: $S_1$ 0.01; $S_2$ 0.022; $S_3$ 0.008) and broadband wavelength coverage from 3.5 to 5 µm. Embodiments of CPM design concepts are also applicable for applications in other wavelength ranges from near-IR to THz and hold great promise to enable ultra-compact high-performance devices for various polarization related applications, such as optical communication, biomedical diagnosis, polarization imaging and spectroscopy.

Numerical Simulations

The Finite-difference time-domain (FDTD) simulations were performed using Lumerical Solutions FDTD. The material optical properties are obtained from the Lumerical library. The unit cell was simulated in the periodic structures with the normal incidence of plane wave source(s), periodic in-plane boundary conditions and perfectly matched layer (PML) out-of-plane boundary conditions. For CPM simulation, 2 orthogonally placed LP sources with $\pm\pi/2$ relative phase retardance go through the gold nanoantenna, SiOx spacer, gold nanograting and sapphire substrate. For oblique incidence cases, Bloch boundary conditions were used and combined with the results from 2 individual orthogonal-placed LP sources to make sure the incident angle is the same over the full wavelength range in the simulation. For CP generation simulation, a LP source polarized perpendicular to the gold nanoantenna is transmitted through the sapphire substrate, gold nanoantenna, SiOx spacer layer and gold nanoantenna. The mesh accuracy was set to 4 and the auto-shutoff for convergence of simulations was set to $10^{-5}$.

Theoretical Model of Anisotropic Metasurfaces

Each metasurface introduces different abrupt phase and amplitude changes for transmitted and reflected light[31]. Due to the anisotropic light responses of the top and bottom metasurfaces, the reflection and transmission coefficients for normal incidence on each metasurface can be modeled by 2-by-2 matrices[48]

$$r_{mn} = \begin{pmatrix} r_{mn}^{xx} & r_{mn}^{yx} \\ r_{mn}^{xy} & r_{mn}^{yy} \end{pmatrix} \quad (4)$$

$$r_{mn} = \begin{pmatrix} t_{mn}^{xx} & t_{mn}^{yx} \\ t_{mn}^{xy} & t_{mn}^{yy} \end{pmatrix} \quad (5)$$

where $$r_{mn}^{xy} = \frac{E_n^y}{E_m^x}(m, n = 1, 2, 3)$$

represents the complex amplitude of the reflected electric field incident from medium m to n propagating in −z-direction, linearly polarized in y-direction for excitation in x-direction, similarly for $t_{mn}^{xy}$. The reflection and transmission coefficients of the metasurfaces can be obtained from a full-wave simulation (FDTD, Lumerical Inc.). The amplitude and phase of the reflected and transmitted electric fields were first exported along X- and Y-directions for X-polarized or Y-polarized LP input light normally incident on the nanogratings, respectively. The nanograting is oriented along the y-axis. Similarly, the reflected and transmitted electric fields of nanoantenna can be obtained along the u-axis. The propagation phases from the source to the nearside of the metasurface and from the metasurface to the nearside of the monitor are subtracted. Since the amplitude of the light source is 1, the reflection and transmission coefficients are the same as the obtained complex electric field.

The reflection and transmission coefficients of nanoantenna along ultraviolet (UV) coordinates as defined and described in regard to FIG. 2D can be transferred to XY coordinates by applying rotation matrix $$ROT(\theta) = \begin{pmatrix} \cos(\theta) & -\sin(\theta) \\ \sin(\theta) & \cos(\theta) \end{pmatrix}$$

in the following equations.

$$r'_{mn}(\theta) = ROT(-\theta) \cdot r_{mn} \cdot ROT(\theta) \qquad (6)$$

$$t'_{mn}(\theta) = ROT(-\theta) \cdot t_{mn} \cdot ROT(\theta) \qquad (7)$$

where $\theta$ is the rotation angle between UV and XY coordinates.

Since the x-axis selected is perpendicular or parallel to the nanograting, the off-diagonal terms of $r_{12}$, $t_{12}$, $r_{21}$ and $t_{21}$ are all zero. Yet for the nanoantenna, after transferring the UV coordinates to XY coordinates, the off-diagonal terms of $r_{23}$, $t_{23}$, $r_{32}$ and $t_{32}$ are non-zero, indicating the interconversion of the x and y field components ($E_x$ and $E_y$) upon light incidence onto the anisotropic metasurfaces.

The $l^{th}$ order of reflection coefficient for the device embodiment described in regard to FIG. 2A with light normally incident from air through nanoantenna array, SiOx spacer, nanogratings into sapphire substrate can be calculated as $$r^{(l)} = \begin{cases} r_{12} & , l = 1 \\ t_{21} \cdot r_{23} \cdot (r_{21} \cdot r_{23})^{l-2} \cdot t_{12} \cdot e^{i2(l-1)k_2 d} & , l \geq 2 \end{cases} \qquad (8)$$

where $$k_2 = \frac{2\pi}{\lambda} n_2$$

and d is the spacer thickness. The total reflected field can be expressed as $(\Sigma_{l=1}^{\infty} r^{(l)}) \cdot E_{inc}$ and the total reflectivity $$R_{tot} = \frac{\left| \left( \sum_{l=1}^{\infty} r^{(l)} \right) \cdot E_{inc} \right|^2}{|E_{inc}|^2}.$$

Similarly, the $l^{th}$ order of the transmitted electric field can be calculated as $$t^{(l)} = t_{23} \cdot (r_{21} \cdot r_{32})^{l-1} \cdot t_{12} \cdot e^{i(2l-1)k_2 d} \qquad (9)$$

The total transmitted field can be expressed as $(\Sigma_{l=1}^{\infty} rZ, t^{(l)}) \cdot E_{inc}$ and the total transmission is $$T_{tot} = \frac{\left| \left( \sum_{l=1}^{\infty} t^{(l)} \right) \cdot E_{inc} \right|^2}{|E_{inc}|^2} \cdot \frac{\text{Re}(n_3)}{\text{Re}(n_1)}.$$

Transfer Matrix Model for Anisotropic Metasurfaces

We also employed a transfer matrix approach (4*4 matrix) to model the relation between the complex reflection coefficients $r_{mn}^{xy}$, transmission coefficients $t_{mn}^{xY}$ and the forwards and backward propagating electric field through our device.

$$\begin{pmatrix} E_{3b} \\ E_{3f} \end{pmatrix} = \begin{pmatrix} M_1 & M_2 \\ M_3 & M_4 \end{pmatrix} \begin{pmatrix} E_{1b} \\ E_{1f} \end{pmatrix} \qquad (10)$$

where $M_1$, $M_2$, $M_3$, $M_4$ are each 2*2 matrix relating the electric fields before the top nanoantenna and after the bottom nanograting (FIG. 2d).

$$\begin{pmatrix} M_1 & M_2 \\ M_3 & M_4 \end{pmatrix} = \begin{pmatrix} t_{32}^{-1} & t_{32}^{-1} \cdot r_{23} \\ r_{32} \cdot t_{32}^{-1} & r_{32} \cdot t_{32}^{-1} \cdot r_{23} + t_{23} \end{pmatrix} \begin{pmatrix} e^{-ik_2 d} I & Z \\ Z & e^{ik_2 d} I \end{pmatrix}. \qquad (11)$$

$$\begin{pmatrix} t_{21}^{-1} & t_{21}^{-1} \cdot r_{12} \\ r_{21} \cdot t_{21}^{-1} & r_{21} \cdot t_{21}^{-1} \cdot r_{12} + t_{12} \end{pmatrix}$$

Here $r_{mn}$ and $t_{mn}$ are the reflectance and transmittance matrix with, $$I = \begin{pmatrix} 0 & 1 \\ 1 & 0 \end{pmatrix} \text{ and } Z = \begin{pmatrix} 0 & 0 \\ 0 & 0 \end{pmatrix}, k_2 = \frac{2\pi}{\lambda} n_2$$

and d is the spacer thickness. The complex reflection and transmission coefficients at each interface at various wavelengths used in the transfer matrix are obtained directly from FDTD simulation. Since there is no backward electric field in the substrate $$E_{3b} = \begin{pmatrix} 0 \\ 0 \end{pmatrix},$$

for a given incident $$E_{1f} = \begin{pmatrix} E_x e^{i\phi_x} \\ E_y e^{i\phi_y} \end{pmatrix},$$

the reflected and transmitted electric fields from our device, $E_{1b}$ and $E_{3f}$, can be calculated with the transfer matrix. The transmission spectra obtained from FDTD simulation, thin-film interference model and transfer matrix approach show good consistency with each other. The difference between the transmission spectrums are a result of the assumption that $R_{mn}$ and $T_{mn}$ obtained from FDTD simulation have a plane wave incident at each interface. For a very thin SiOx spacer layer, the interlayer interaction between the nanoantenna and nanograting is strong and the electric field incident from the nanoantenna to the nanograting is not exactly plane wave. Nevertheless, this serves as a good approximation to simplify the calculation.

Fabrication

Embodiments of chiral plasmonic metasurfaces as discussed herein, in particular in regard to FIG. 3A, are fabricated by first creating nanogratings. First, gold nanograting is fabricated with a thin layer of Cr (~6 nm) being thermally evaporated onto a sapphire substrate as a discharging layer. Double layer polymethyl methacrylate (PMMA) (200 nm 495K molecular weight+70 nm 950K molecular weight) was then spin-coated on the Cr layer. Then nanograting patterns were written with electron beam lithography (EBL) using a JEOL JBX-6000FS. Then the samples were developed in a methyl isobutyl ketone: isopropyl alcohol (MIBK: IPA) (1:3) solution for 2 min and rinse with deionized (DI) water for 1 min. Subsequently, the PMMA residue was removed with $O_2$ plasma using a Plasma-Therm 790 with parameters $O_2$ 10 sccm, 8mT, 25W for 18s. Next, Cr (5 nm)/Au(125 nm) was deposited with thermal evaporation and lifted-off in acetone and rinsed with IPA. And then, the Cr discharging layer was removed by Cr dry etching using a PlasmaLab M80 Plus with the following parameters: $Cl_2/O_2$ 38/2 sccm, 40s.

To fabricate the SiOx spacer layer, the sample was cleaned by O2 plasma using a Plasma-Therm 790, with the following parameters: $O_2$ 10 sccm, 8mT, 25W for 3 min and deposited with 349 nm SiOx by Sputtering using a Lesker PVD 75, at a rate of 0.5 Å/s.

The gold nanoantennas were completed by coating the sample with a thin layer of Cr (~6 nm) by thermal evaporation and spin-coating with double layer PMMA (100 nm 495K+70 nm 950K). Then the sample is patterned with EBL, developed in MIBK/IPA and cleaned with O2 plasma as described earlier. After that, Cr(5 nm)/Au(50 nm) was thermally evaporated on the sample and lifted off in acetone. Finally, the Cr discharging layer was removed by Cr dry etching using a PlasmaLab M80 Plus with $Cl_2/O_2$ 38/2 sccm, 40s.

Measurement

Optical characterization of devices was performed with a Bruker Vertex 70 FTIR spectrometer and Hyperion 2000 microscope. One 15× objective and one condenser lenses with N.A.=0.4 were used.

Reference polarization state measurement with PSA

Unpolarized light from FTIR is first polarized with a linear polarizer and a QWP and then characterized by the PSA, a rotating linear polarizer. The fully polarized input light can be described by the Jones vector as $$J = \begin{pmatrix} E_{x0} \\ E_{y0}e^{i\delta} \end{pmatrix}$$

where $E_{x0}$ and $E_{y0}$ is the amplitude of electric field along x and y-axis and $\delta$ ($-180°<\delta\leq180°$) is the phase different between $E_{y0}$ and $E_{x0}$, respectively. Then the angle-resolved transmission T($\alpha$) through the linear polarizer rotated along angle $\alpha$($0\leq\alpha<180°$) can be describe as the following equation.

$$T(\alpha)=|E_{x0}\cos\alpha+E_{y0}e^{i\delta}\sin\alpha|^2 \quad (12)$$

which is equivalent to eq. (13).

$$T(\alpha)=E_{x0}^2\cos^2\alpha+E_{y0}^2\sin^2\alpha+E_{x0}E_{y0}\sin 2\alpha\cos\delta \quad (13)$$

With measurements along 3 angles, we can obtain $E_{x0}$, $E_{y0}$ and $|\delta|$ which can be converted to Stokes parameters. Measurements for more angles can be taken to increase the measurement accuracy with least-mean-square method. In these experiments, 13 or more T($\alpha$) are measured to characterize each input polarization state. This method can be used to measure the Stokes parameters over a broad wavelength range with a FTIR, which reduces the requirement for the broadband QWP. However, it cannot tell the handedness of light and the measurement accuracy relies on high extinction ratio of the polarizer used for the angle-resolved measurement and the signal-to-noise ratio of the measurement system.

CPM Characterization

For CPM characterization measurement, unpolarized light from an FTIR was converted to circularly polarized light with a linear polarizer and a low-order QWP (WPLQ05M-4000) around 4 μm. The handedness of the CP light was controlled to be right-handed (or left-handed) by setting the angle between the fast axis of the QWP and the axis of the polarizer to be 45° (or −45°). The light was then focused onto the sample and the transmitted light was collected by a Mercury Cadmium Telluride (MCT) detector.

CPM Generation

For CP generation measurement, unpolarized light from FTIR was first converted to LP light with its electrical field oriented perpendicular to the axis of the nanogratings. Then it was incident onto the device from the nanograting side. The transmitted light passed through a rotating linear polarizer before getting collected by the MCT detector of the FTIR system to obtain the polarization state of the transmitted light and conversion efficiency. Conventional methods of measuring the full Stokes parameter utilizes a QWP and a linear polarizer. However, the lack of broadband QWP in mid-IR makes it challenging for the polarization measurement over the entire 3~5 μm. The microscope of FTIR system used does not have enough space for the QWP. Therefore, a method was developed to use only a linear polarizer to measure the Stokes parameters, which can only be used for fully polarized light and cannot tell the sign of $S_3$ or DOCP. The Stokes parameters of the output light through the device were extracted from the FDTD simulation and obtain the estimated sign of $S_3$ and DOCP.

Stokes Parameters Detection

To obtain the transmission coefficient of each polarization filter, 6 polarization states were generated, including LP light polarized along 90°, 0°, −45°, 45°, LCP and RCP light and measured the transmission through the microscale polarization filters, $P_1$ to $P_6$, correspondingly. The transmission coefficients of each of the polarization filters were used to calibrate the measured intensity for Stokes parameter detection.

For Stokes parameters detection measurement, arbitrary polarization states of the input light were generated by changing the rotation angle of the linear polarizer and quarter-waveplate (QWP, operation wavelength around 4 μm). To determine the measurement accuracy, the input polarization states were characterized with a PSA based on a rotating linear polarizer. Assume the input light is purely polarized. By measuring the angle-resolved transmission spectra with a linear polarizer, the Jones vector of the input light can be obtained, which can be converted to $S_1$, $S_2$ and magnitude of $S_3$ of the input light. Then the sign of $S_3$ was estimated based on the retardance curve of the QWP from the vendor. After that, the PSA was replaced with samples representing an embodiment described herein, refocused and measured the transmission of each of the six polarization filters by moving the motorized stage and selecting the point-of interests with an aperture at the image plane.

Muller Matrix Characterization of the Device

The polarization response of an optical device or system can be described by a Muller matrix M, which links the input polarization states $\vec{S}_{in}=(S_0,S_1,S_2,S_3)$ and the output polarization states $\vec{S}_{out}=(S'_0, S'_1, S'_2, S'_3)$ written in the form of Stokes parameters.

$$\begin{pmatrix} S'_0 \\ S'_1 \\ S'_2 \\ S'_3 \end{pmatrix} = \begin{pmatrix} M_{00} & M_{10} & M_{20} & M_{30} \\ M_{01} & M_{11} & M_{21} & M_{31} \\ M_{02} & M_{12} & M_{22} & M_{32} \\ M_{03} & M_{13} & M_{23} & M_{33} \end{pmatrix} \cdot \begin{pmatrix} S_0 \\ S_1 \\ S_2 \\ S_3 \end{pmatrix} \quad (14)$$

From eq. (14), the output light intensity ($S'_0$) can be described by the first row of the Muller matrix and $\vec{S}_{in}$ $$S'_0 = M_{00}S_0 + M_{10}S_1 + M_{20}S_2 + M_{30}S_3 \quad (15)$$

The first row of the Muller matrix for each polarization filter can be determined by transmitting four polarization states with known Stokes parameters measured with the PSA and measuring the corresponding output Stokes parameters for each of the filter. Then the following equation can be solved to obtain the Muller matrix elements ($M_{00}(\lambda)$ $M_{10}(\lambda)$ $M_{20}(\lambda)$ $M_{30}(\lambda)$) at each wavelength.

$$\begin{pmatrix} S_0^{Pol'_1} \\ S_0^{Pol'_2} \\ S_0^{Pol'_3} \\ S_0^{Pol'_4} \end{pmatrix} = \begin{pmatrix} S_0^{Pol_1} & S_0^{Pol_2} & S_0^{Pol_3} & S_0^{Pol_4} \\ S_1^{Pol_1} & S_1^{Pol_2} & S_1^{Pol_3} & S_1^{Pol_4} \\ S_2^{Pol_1} & S_2^{Pol_2} & S_2^{Pol_3} & S_2^{Pol_4} \\ S_3^{Pol_1} & S_3^{Pol_2} & S_3^{Pol_3} & S_3^{Pol_4} \end{pmatrix} \begin{pmatrix} M_{00} \\ M_{10} \\ M_{20} \\ M_{30} \end{pmatrix} \quad (16)$$

where $S_i^{Pol j}$ is the Stokes parameter $S_i$ (i=0~3) for polarization state number j and $S_0^{Pol' j}$ is the measured output intensity though the polarization filter for polarization state number j.

The determinant of the matrix in eq. (16) should be nonzero to have unique solutions for the Muller matrix elements. More than 4 polarization states can also be used to solve the over-constrained equation to obtain the Muller Matrix with least-mean-square method for higher accuracy. Here 6 input polarization states were measured to obtain the Muller matrix elements for all 6 polarization filters.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A circular polarization filter comprising:
   a substrate;
   a nanograting pattern extending from the substrate;
   a dielectric layer formed directly on the nanograting pattern; and
   a plasmonic structure in direct contact with the dielectric layer, wherein the plasmonic structure comprises parallel protrusions extending from or buried in the dielectric layer, and wherein the parallel protrusions of the plasmonic nanostructure are oriented at a nonzero angle with respect to the nanograting pattern.

2. The circular polarization filter of claim 1, wherein the nanograting pattern comprises parallel protrusions extending from the substrate.

3. The circular polarization filter of claim 2, wherein the parallel protrusions of the nanograting pattern comprise metal.

4. The circular polarization filter of claim 3, wherein the metal comprises gold, silver, or aluminum.

5. The circular polarization filter of claim 1, wherein the plasmonic structure comprises plasmonic bar antennas.

6. The circular polarization filter of claim 1, wherein the parallel protrusions of the plasmonic nanostructure comprise metal.

7. The circular polarization filter of claim 6, wherein the metal comprises gold, silver, or aluminum.

8. The circular polarization filter of claim 1, wherein the parallel protrusions of the plasmonic structure are oriented at a 45-degree angle relative to the nanograting pattern.

9. The circular polarization filter of claim 1, wherein the parallel protrusions of the plasmonic structure are oriented at a 135-degree angle relative to the nanograting pattern.

10. The circular polarization filter of claim 1, wherein the dielectric layer comprises SiOx, aluminum oxide, or an undoped semiconductor.

11. The circular polarization filter of claim 10, wherein the substrate comprises sapphire, silicon, or fused silica.

12. The circular polarization filter of claim 10, wherein an operation wavelength of the circular polarization filter is in the mid-infrared range.

13. The circular polarization filter of claim 1, wherein the substrate transmits light in an operation wavelength of the circular polarization filter.

14. The circular polarization filter of claim 1, wherein the nanograting pattern has a period smaller than an operation wavelength of the circular polarization filter.

15. The circular polarization filter of claim 1, wherein the nanograting pattern has a period between about 100 nm and about 1000 nm, between about 100 nm and about 500 nm, or between about 200 nm and about 300 nm.

16. The circular polarization filter of claim 1, wherein the nanograting pattern has a duty cycle between about 20% and about 80% or between about 40% and about 60%.

17. The circular polarization filter of claim 1, wherein the dielectric layer has a thickness between about 100 nm and about 10,000 nm, between about 100 nm and about 1000 nm, or between about 300 nm and about 400 nm.

18. An integrated polarization filter array, comprising:
a linear polarization filter; and
a circular polarization filter, comprising:
  a substrate;
  a nanograting pattern extending from the substrate;
  a dielectric layer formed directly on the nanograting pattern; and
  a plasmonic structure in direct contact with the dielectric layer, wherein the plasmonic structure comprises parallel protrusions extending from or buried in the dielectric layer, and wherein the parallel protrusions of the plasmonic nanostructure are oriented at a nonzero angle with respect to the nanograting pattern.

19. The integrated polarization filter array of claim 18, wherein the nanograting pattern comprises parallel protrusions extending from the substrate.

20. The integrated polarization filter array of claim 18, further comprising four linear polarization filters and two circular polarization filters.

21. The integrated polarization filter array of claim 18, wherein the parallel protrusions of the plasmonic structure are oriented at a 45-degree angle relative to the nanograting pattern.

22. The integrated polarization filter array of claim 18, wherein the parallel protrusions of the plasmonic structure are oriented at a 135-degree angle relative to the nanograting pattern.

* * * * *